US008321579B2

(12) United States Patent
Aggarwal et al.

(10) Patent No.: US 8,321,579 B2
(45) Date of Patent: Nov. 27, 2012

(54) SYSTEM AND METHOD FOR ANALYZING STREAMS AND COUNTING STREAM ITEMS ON MULTI-CORE PROCESSORS

(75) Inventors: Charu Chandra Aggarwal, Mohegan Lake, NY (US); Rajesh Bordawekar, Yorktown Heights, NY (US); Dina Thomas, Stanford, CA (US); Philip Shilung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1523 days.

(21) Appl. No.: 11/828,732

(22) Filed: Jul. 26, 2007

(65) Prior Publication Data

US 2009/0031175 A1    Jan. 29, 2009

(51) Int. Cl.
G06F 15/16    (2006.01)
(52) U.S. Cl. ........ 709/231; 709/201; 709/202; 712/220; 714/51
(58) Field of Classification Search .......... 709/201–202, 709/212–213, 231; 707/999.01; 712/220–227; 714/47.1–47.3, 48–52
See application file for complete search history.

(56) References Cited

U.S. PATENT DOCUMENTS

| 6,526,447 | B1 * | 2/2003 | Giammaria | 709/232 |
|---|---|---|---|---|
| 7,219,121 | B2 * | 5/2007 | Kaniyar et al. | 709/201 |
| 7,705,753 | B2 * | 4/2010 | Speirs et al. | 341/50 |
| 7,788,334 | B2 * | 8/2010 | Blumrich et al. | 709/212 |
| 7,793,278 | B2 * | 9/2010 | Du et al. | 717/160 |
| 2006/0218123 | A1 * | 9/2006 | Chowdhuri et al. | 707/2 |
| 2008/0222338 | A1 * | 9/2008 | Balasubramanian et al. | 712/223 |
| 2009/0049281 | A1 * | 2/2009 | Kim et al. | 712/220 |

OTHER PUBLICATIONS

Alon et al., The Space Complexity of Approximating the Frequency Moments; Proceedings of the 28th Annual ACM Symposium on Theory of Computing (STOC), May 1996; pp. 1-19.
Cormode et al., What's Hot and What's Not: Tracking Most Frequent Items Dynamically PODS 2003; Jun. 9-12, 2003, San Francisco, CA; pp. 296-306.
Metwally et al., Efficient Computation of Frequent and Top-k Elements in Data Streams, Dept. of Computer Science, University of CA; 2005; pp. 1-21.

(Continued)

*Primary Examiner* — Bharat N Barot
(74) *Attorney, Agent, or Firm* — Tutunjian & Bitetto, P.C.; Anne V. Dougherty

(57) ABSTRACT

Systems and methods for parallel stream item counting are disclosed. A data stream is partitioned into portions and the portions are assigned to a plurality of processing cores. A sequential kernel is executed at each processing core to compute a local count for items in an assigned portion of the data stream for that processing core. The counts are aggregated for all the processing cores to determine a final count for the items in the data stream. A frequency-aware counting method (FCM) for data streams includes dynamically capturing relative frequency phases of items from a data stream and placing the items in a sketch structure using a plurality of hash functions where a number of hash functions is based on the frequency phase of the item. A zero-frequency table is provided to reduce errors due to absent items.

19 Claims, 21 Drawing Sheets

OTHER PUBLICATIONS

Joe Kleinberg, Bursty and Hierarchical Structure in Streams, Proc. of the 8th ACM SIGKDD; 2002; pp. 1-25.

Charikar et al., Finding Frequent Items in Data Streams, Automata Languages and Programming, 29th Int'l Colloquium, ICALP 2002; 2002; pp. 693-703. Cormode et al., An Improved Data Stream Summary: The Count-Min Sketch and its Applications, Elsevier Science; Dec. 16, 2003; 18 pages.

J. Misra et al., Finding Repeated Elements; Science of Computer Programming 2; 1982; pp. 143-152.

Manku et al., Approximate Frequency Counts over Data Streams, Proceedings of the 28th VLDB Conference, Hong Kong, China; 2002; 12 pages.

Johnson et al., Sampling Algorithms in a Stream Operator; SIGMOD; 2004; Jun. 14-16, Baltimore, MD; 2004; pp. 1-12.

Robert S.. Boyer et al., MJRTY—A Fast Majority Vote Algorithm, Automated Reasoning: Essays in Honor of Woody Bledsoe. Kluwer Academic, Dordrecht, The Netherlands, 1991, pp. 105-117.

* cited by examiner

SYSTEM AND METHOD FOR ANALYZING STREAMS AND COUNTING STREAM ITEMS ON MULTI-CORE PROCESSORS

BACKGROUND

1. Technical Field

The present invention relates to data stream analysis and, more particularly, to a system and method for analyzing streams and counting stream items.

2. Description of the Related Art

Recent technological advances have led to a proliferation of applications which can generate and process data streams. Data streams are sequences of data items that can be generated continuously at dynamically varying rates and need to be processed at equivalent rates as soon as they are received by the processing elements. Such data streaming applications often process large quantities of data that can potentially grow without limit at a rapid rate, putting enormous burden on the computational and memory resources of an underlying system.

Many issues exist in networks that process streams of information. One of the key data streaming applications involves determining frequency statistics of the stream items in real-time. Examples of such statistics include frequency moments, determining heavy hitters, and order statistics. The problem of frequency querying of data streams includes some of the following issues. For example, one can query a stream to calculate the number of occurrences or the frequency of items in a section of the stream observed so far. Formally, this stream frequency counting problem can be defined as follows: Let stream $S=(s_1, \ldots, s_N)$ be a sequence of items, where each $s_i$ is a member of a domain $D=(1, \ldots, d)$. Estimate the frequency of a unique item $s_j$ in the sub-sequence $S(t)=(s_1, \ldots, s_t)$, where $t \leq N$. (This type of query is also referred to as the point query). Clearly, the values of N and d can be very large and the item frequency can vary over time.

For example, in web click streams or phone call streams, the number of possible unique items (i.e., web pages or phone numbers) could easily range in the order of hundreds of millions or even billions. In many cases, the processing of data collected in large sensor networks is performed on the sensor nodes which have limited memory and power consumption. Obviously, to satisfy the memory and real-time execution constraints, the input stream data can not be stored in its entirety. Therefore, the counting applications employ algorithms that strive to maximize the computational performance while minimizing the memory usage.

In stream processing, specifically for a cell processor, for example, a typical core may contain only 256 KB of memory. The distributed counting problem will be designed for counting the frequencies of items in a data stream to answer point and range queries. Multiple streams may be processed in parallel, and each stream is potentially distributed over multiple processing cores which it needs to be stored in. A well-known memory-efficient technique for counting items from data streams uses probabilistic data structures, e.g., sketches. The sketch method is essentially a random projection based approach which uses either linear projections or hash functions to condense the input stream data into a summary. The results for a point query can then be extracted from these condensed summaries. While the sketch-based approach reduces the space complexity of the counting process, additional modifications are needed to improve the computational performance.

A traditional approach for improving computational performance involves partitioning the work across multiple processing entities and executing them in parallel. In recent times, such parallel approaches have become even more practical due to availability of systems that use multi-core processors. The multi-core processors support multiple, potentially heterogeneous, on-chip processing cores connected via high-bandwidth, low-latency interconnection fabric. Such features enable the multi-core processors to provide very high computational performance at relatively low power consumption. These capabilities make the multi-core processors potentially suitable platforms for streaming data processing. In recent years, distributed processing has been widely studied as a method for accelerating performance stream processing algorithms.

SUMMARY

Systems and methods for parallel stream item counting are disclosed. A data stream is partitioned into portions and the portions are assigned to a plurality of processing cores. A sequential kernel is executed at each processing core to compute a local count for items in an assigned portion of the data stream for that processing core. The counts are aggregated for all the processing cores to determine a final count for the items in the data stream.

A frequency-aware counting method (FCM) for data streams includes dynamically capturing relative frequency phases of items from a data stream and placing the items in a sketch structure using a plurality of hash functions where a number of hash functions is based on the frequency phase of the item. A zero-frequency table is provided to reduce errors due to absent items.

A multiprocessor includes a plurality of processing cores, which include a coordinating processor core, and at least one other processing core managed by the coordinating processing core. The plurality of processing cores is configured to receive and partition a data stream into portions to permit parallel counting for items in the data stream. A sequencing kernel is executed by each of the core processors to implement a frequency-aware counting method. The frequency aware counting method includes a sketch structure configured to store item counts using a plurality of hash functions where a number of hash functions is based on the frequency phase of the item, and a zero-frequency table configured to reduce errors due to absent items using all of the hash functions.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
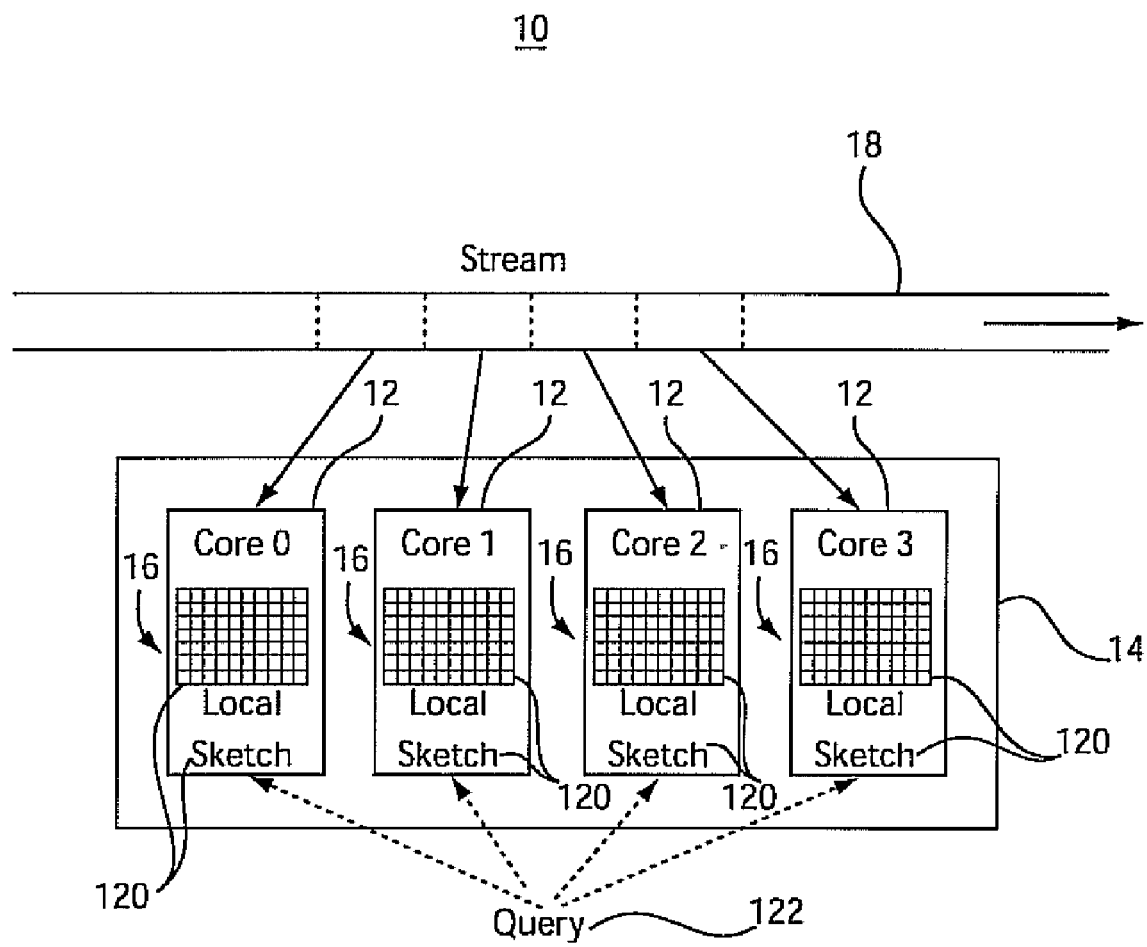
FIG. 1 is a block diagram showing a multiprocessor employing a parallel counting method in accordance with one illustrative embodiment.

Embodiments described herein provide parallel counting systems and methods for estimating frequencies of items from data streams where a stream is ingested and queried in parallel by partitioning data over multiple processing cores of a multi-core processor. Current probabilistic counting methods are ill-suited to be used as the sequential kernel in the parallel method due to space limitations, inaccuracies in approximating counts of low frequency items, and inability to identify the absent items in a stream. To address these concerns, a new sequential counting system and method, referred to as a Frequency-aware Counting Method (FCM) is introduced in accordance with the present principles.

A new parallel system and method is provided herein which addresses the stream counting problem using a probabilistic sketch data structure. The parallel method uses data partitioning to distribute stream ingestion and querying across multiple processor cores. While designing the parallel method, we have identified two key problems with the existing probabilistic counting algorithms: (1) under limited memory, the estimates for infrequent (low-frequency) items are inaccurate, and (2) it is not possible to detect if an item was absent in the data stream analyzed so far. Hence, the estimates for zero-frequency items (i.e., items absent from the input stream) are also inaccurate. These problems gain importance in the parallel execution model as the data partitioning strategy can lead to an uneven distribution of items across the processing cores. Therefore, items with even modestly high frequencies can sometimes have low or zero-frequencies on particular processors.

To address these issues, the FCM is provided in accordance with the present principles and is related to the Cormode-Muthukrishnan Count-Min (CM) algorithm. FCM incorporates a number of novel features to address the estimation problems for low-frequency and zero-frequency items in the parallel setting. The parallel method uses the FCM as the sequential counting kernel.

FCM improves accuracy in estimating low-frequency items by dynamically capturing frequency changes of items in the stream, and uses a variable number of hash functions per item as determined by an item's current frequency. FCM also employs an auxiliary space-efficient data structure to reduce the errors due to absent items.

As will illustratively be described, the parallel counting method was implemented on a multi-core cell processor using FCM as the sequential kernel. We experimentally and analytically demonstrate that with similar space consumption, FCM computes better frequency estimates of both the low- and high-frequency items than the Count-Min algorithm by reducing collisions with high-frequency items. FCM also significantly reduces the errors in identifying absent items. In the parallel scenario, as the number of processing cores is increased, using a hash-based data partitioning approach, the parallel method is able to scale the overall performance linearly as well as improve the estimate accuracy.

The parallel method has been evaluated on a modern heterogeneous multi-core processor: the 9-core "Cell" processor. Although the Cell was initially designed as a game processor, it is being increasingly used in blade servers for developing commercial and scientific applications. Cell's high single-precision floating point performance (204 GFLOPS at 3.2 GHz) along with high memory (25.6 GB/s peak) and I/O (76.8 GB/s peak) bandwidths make it ideal for stream processing.

New parallel and sequential stream counting systems and methods are provided. Specifically, at least the following contributions are provided in accordance with the present principles.

1. Frequency-aware Counting Method (FCM): The FCM uses at least three novel ideas to address the estimation issues with low- and high-frequency items. First, FCM uses a space-conserving data structure to dynamically capture the relative frequency phase of items from an incoming data stream. Second, the FCM uses a variable number of hash functions for each item as per its current frequency phase (e.g., "high" or "low"). A high-frequency item uses fewer hash functions, whereas a low-frequency item uses more hash functions to update the sketch. Thirdly, the FCM uses an additional sketch data structure called the Zero-frequency table to reduce estimation errors due to absent items. We have analytically evaluated these features and computed error bounds for the frequency-aware counting method.

2. Scalable Parallel Method: The parallel method partitions the work across multiple processing cores of a multi-core processor. The method uses two different data partitioning strategies: block-based and hash-based distribution. Each processing core executes the FCM as the sequential kernel and computes its local count. The local counts are then aggregated to compute a final result.

3. Implementation on the Cell Processor: The parallel method and the FCM have been implemented on the multi-core Cell processor. The code has been optimized to exploit Cell's architectural and programming capabilities (e.g., data and work partitioning, computational strip-mining, and short-vector data parallelization). We have evaluated the implementation using Zipf and Normal datasets and demonstrated that FCM improves the estimation quality over the CM algorithm for the entire frequency range of the input data, in both sequential and parallel scenarios. Our experiments illustrate that simply partitioning data across multiple processors does not lead to an improvement in estimation quality as the number of processors is increased. The parallel method achieves linear performance scalability and estimation improvement, using hash-based data partitioning, along with the zero-frequency table.

These results conclusively validate the systems/methods and efficacy of the key data structures in accordance with the present principles. Further, using the hash-based data partitioning, the parallel method is able to improve data ingestion performance as well as the estimation quality as the number of processors is increased.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Parallel Stream Processing: Sketch-based probabilistic counting algorithms can be evaluated using three criteria: (1) Quality of results, (2) Space utilization, and (3) Time to store and query the stream data-sets. One goal of parallelizing such algorithms is to improve both the result quality, and times for stream ingestion and processing, while maintaining the space utilization.

The sketch based method was employed as an application of random projection techniques for space-efficient determination of aggregate characteristics of the stream such as frequency moments and frequent items. The broad idea of the original sketch technique is that a stream can be viewed as a very high dimensional vector whose dimensionality is determined by the number of items in the stream, and a random projection of this stream can be used to determine aggregate functions of the frequencies of the individual items. A pseudo-random number generator is used to dynamically generate the components of the random projection vector rather than explicitly storing them. The sketch based method is particularly useful for the space-constrained scenario (such as a cell processor) since its space-requirements are logarithmic in terms of the number of distinct items in the data stream. Subsequently, a variety of other sketch based methods were proposed which vary from the random projection idea for sketch computation. These include hash-based structures (Count Sketch), and the count-min sketch.

Referring now to the drawings in which like numerals represent the same or similar elements and initially to FIG. 1, for devising a parallel method, we assume an abstract parallel machine 10 including p processing units 12 sharing a main memory 14. In addition, each processing unit 12 has private local memory 16. The per-processor local memory 16 is usually substantially smaller than the shared main memory 14. These processors 12 can communicate either using shared data structures or via explicit messages. One of the processors 12 can act as the coordinator and manage tasks for the remaining processors. This abstract model captures the architecture of most current multi-core processors designed for stream data processing (such as Cell and Network processors) and standard multi-threaded programming models like Pthreads. Thus, the present methods can be implemented on a wide variety of available software and hardware platforms.

It should be understood that multiple streams 18 may be handled simultaneously using the parallel counting method described herein. Counting occurrences of unique items in data streams has many applications. For example, sensors, biometric devices and applications, network processing, web click analysis, etc., all search for items in data streams, and the frequency of the items is one important parameter in carrying out the respective functions of these devices. Other applications include investigating if data streaming applications are suitable for a Cell architecture. The multi-core architecture 10 provides improved quality by exploiting multiple processors, improved performance via data distribution, and computational capabilities that match stream input rate.

Figure 2:
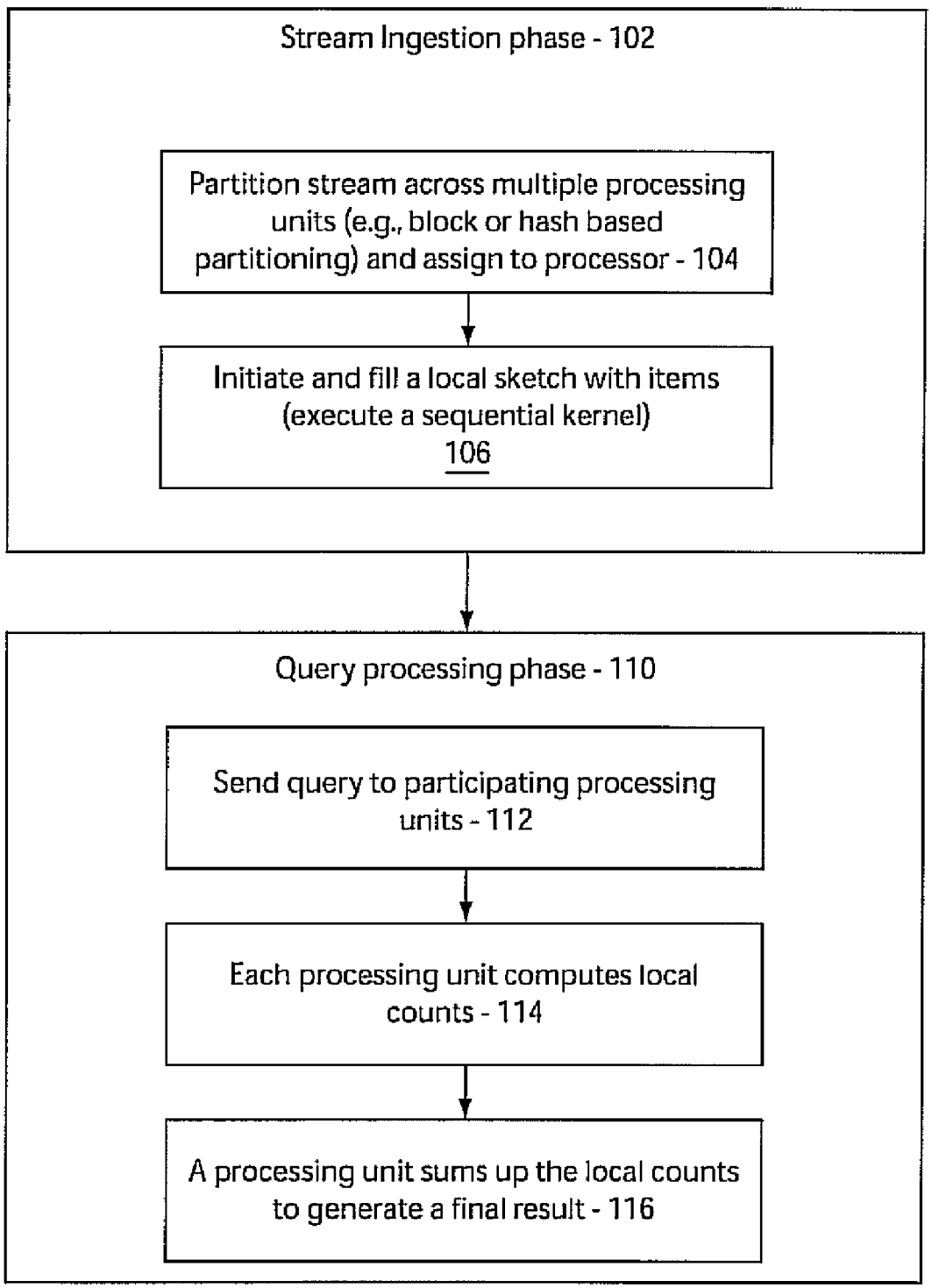
FIG. 2 is a block/flow diagram showing a system/method for parallel stream counting in accordance with one embodiment.

Referring to FIG. 2 with continued reference to FIG. 1, a block/flow diagram shows a system/method for parallel stream counting in accordance with one illustrative embodiment. In block 102, a stream ingestion phase includes the following. In block 104, a stream 18 is partitioned across multiple processing units 12. In block 106, each processing unit initiates and fills its local sketch 120. In a processing phase (block 110), a query 122 is sent to participating processing units 12 in block 112. In block 114, each processing unit 12 computes local counts. A processing unit 12 sums up the local counts to generate the final result in block 116.

As the item counting problem is commutative in nature, it can be easily parallelized via partitioning items over participating processors. FIG. 2 presents an outline of the parallel counting method. Conceptually, this method has two phases: in an ingestion phase 102, the coordinating processor 12 distributes the incoming stream 18 over multiple processing units 12. Each processing unit 12 initializes a private (local) sketch 120 in its local memory and populates the sketch using a traditional (sequential) counting algorithm over the part of the stream assigned to the processing unit 12. In the querying processing phase (block 110), depending on the type of the query (e.g., point or range query), the coordinator (e.g., one of the units 12) sends one or more items to the participating processors (12). Each processor (12), in turn, uses its private sketch 120 to calculate the local count. The local counts are added by the coordinator and the resultant sum is returned as the approximate result of the query. The two phases (102 and 110) can overlap, i.e., a stream can be queried as it is being processed.

The performance of the parallel method depends on, e.g.: (1) Stream data partitioning strategies and (2) A sequential algorithm. The data partitioning strategies divide the work across multiple cores (12) by distributing the stream data 18. The data partitioning modifies statistical characteristics of the input data stream 18. As a consequence, a frequent stream item may appear as a low frequency item to some processors and some processors may not even view the item (i.e., it will appear as an absent zero-frequency item). As we illustrate in the following sections, such behavior leads to increased errors in computing per-processor local counts, in particular, when using limited memory. As the final result is computed by adding local counts, the data partitioning strategies also affect the extent of the error in the final result.

The sequential counting kernel used by each processor determines the quality of local results, per-processor space consumption, and the stream ingestion time. The ideal sequential counting kernel should compute accurate results while consuming as little memory as possible. There are at least two ways of partitioning data streams: block-based and hash-based partitioning.

Hash-based partitioning: This approach uses a value-based partitioning strategy in which the coordinating processor hashes the input stream values into p buckets. The buckets are then distributed over different processor groups (e.g., 8 processors can be partitioned as 4 processor groups, each including 2 processors, or 8 processor groups, each with an individual processor). Each processor within a processor group reads disjoint sections of a bucket and populates its local sketch. During the querying phase, the coordinating processor hashes the query item into a bucket. Only those processors that are associated with this bucket are queried and their estimates are aggregated as the estimated count of the query item. The value-based partitioning may lead to unequal distribution of data across the processor groups which can cause load imbalance. This is generally not an issue when the number of processors is small.

On the other hand, this method (hashing) of partitioning groups together all occurrences of items with a particular value. Thus, the relative frequency of items observed by a processor group is higher than in the input stream.

Block-based partitioning: In this method, no pre-processing is performed on the input stream. As the stream is read by the coordinating processor, it is divided into equal disjoint chunks. Each chunk is sent to a processor in a round-robin fashion. In the querying phase, the coordinating processor forwards the query item to all the processing units. Each processor returns an estimate for the count of the item. The coordinating processor sums up the individual local counts and returns the result as the answer to the query.

Unlike the hash-based partitioning, block-based partitioning distributes work equally among the processors. Also, the coordinator needs to do less work as there is no need to compute hash values per item in the input stream. However, unlike hash-based partitioning, all processors are queried for each query. When the coordinating processor sums up the estimates from each unit, it also sums up the error returned by each unit. Hence, the final error bound of this method is p times the error of a single processor, where p is the total number of processors. In the case of hash-based partitioning, the final error bound is p' times the error of a single processor, where p' is the number of processors in the processor group.

Choosing the Sequential Counting Kernel: As multi-core processors may have limited per-core memory (e.g., 256 KB for the Cell, 32 KB for the Intel IXP2800), it is necessary to select a sequential counting algorithm with the lowest space consumption. For selecting the sequential counting kernel, three well-known counting algorithms were evaluated: AMS, Count Sketch (CCFC), and Count-Min (CM). All of these algorithms use some form of the probabilistic sketch data structure which gets updated using random values generated via multiple hash functions. However, these algorithms differ in the number of hash functions used, the size of the sketch and the way the sketch is updated. Table 1 compares these three algorithms.

TABLE 1

Stream Counting Algorithms: AMS, CCFC and CM.

| Algorithm | Hash Range: w | No. Hash Functions: d | Space |
|---|---|---|---|
| AMS | 1 | $2\log(1/\delta)$ | $16/\epsilon^2 d$ |
| CCFC | $8/\epsilon^2$ | $\log(n/\delta)$ | wd |
| CM | $e/\epsilon$ | $\log(1/\delta)$ | wd |

TABLE 1 presents an analytical comparison of the total space usage, the number of hash functions used, and the hash function ranges, between the AMS, CCFC, and CM algorithms. For comparison purposes, we use a pair of user-specified parameters, error bound, $\epsilon$, and probability bound, $\delta$. For the CCFC and AMS algorithms, the error is within a factor of $\epsilon$ with the probability of $1-\delta$, and for the CM algorithm, the error is within a factor of E times the L1-norm of the sketch with the probability of $1-\delta$. As Table 1 illustrates, for a given $\epsilon$ and $\delta$, for CM and CCFC algorithms, the space utilization is determined by the number of hash functions and the hash function range. Among the three algorithms, the CM algorithm is the most space-efficient and the space complexity of the other two algorithms is worse by an order of magnitude.

To experimentally compare these algorithms, the implementations of these three algorithms were analyzed from the MassDAL Public Codebank (www.cs.rutgers.edu/~muthu/massdal.html) against 16 MB (4M Integers) of Zipf ($\lambda=1.1$) and Normal ($\sigma=20$) data. We ran a point query using $\epsilon=0.1$ and δ=0.001, to compute the frequency of a stream item against every member of the dataset and compared the results computed by the algorithms with the actual frequency.

Figure 3:
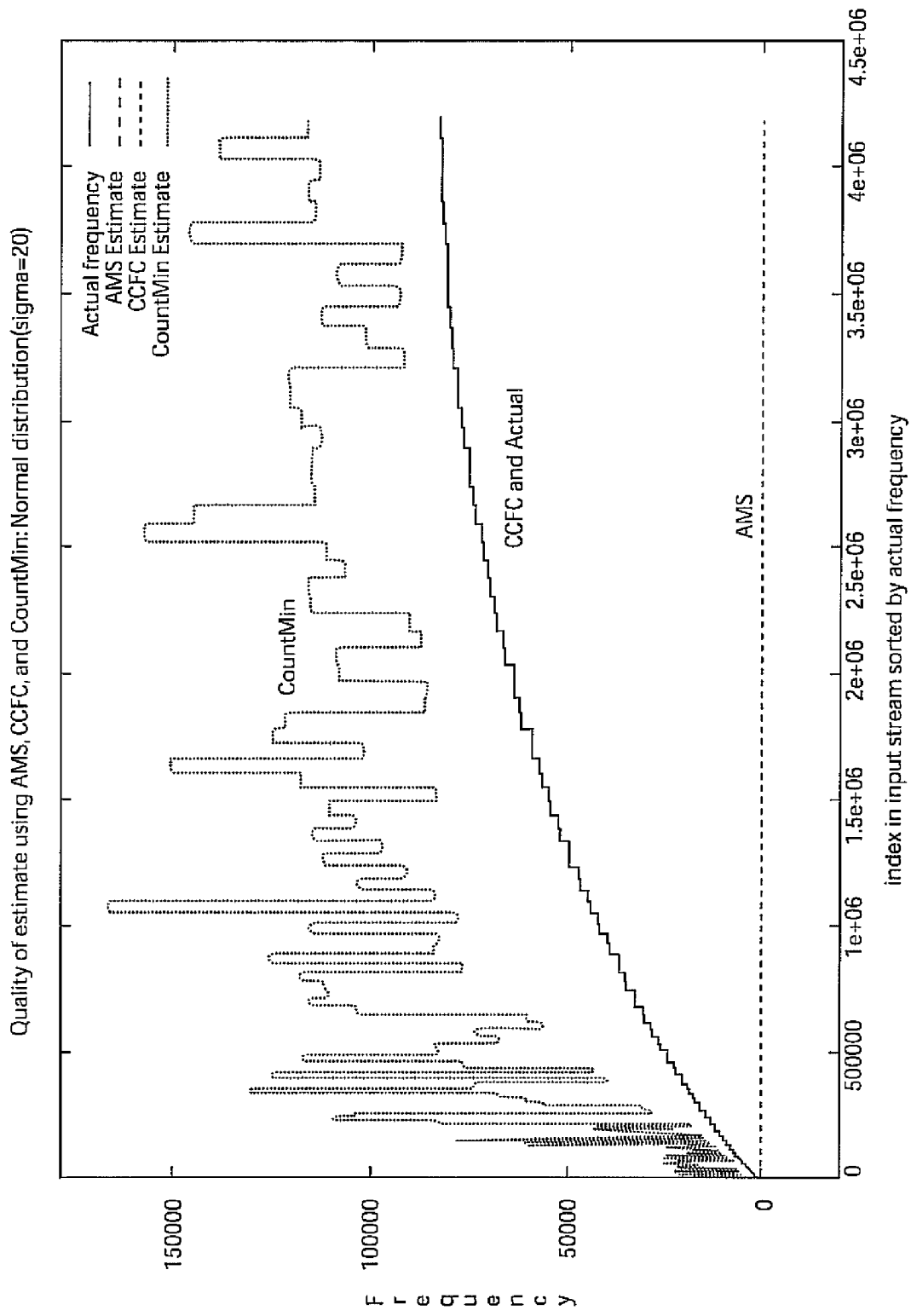
FIG. 3 is a plot showing an evaluation of three selected counting methods on a 16 MB Normal ($\sigma$=20) dataset.
Figure 4:
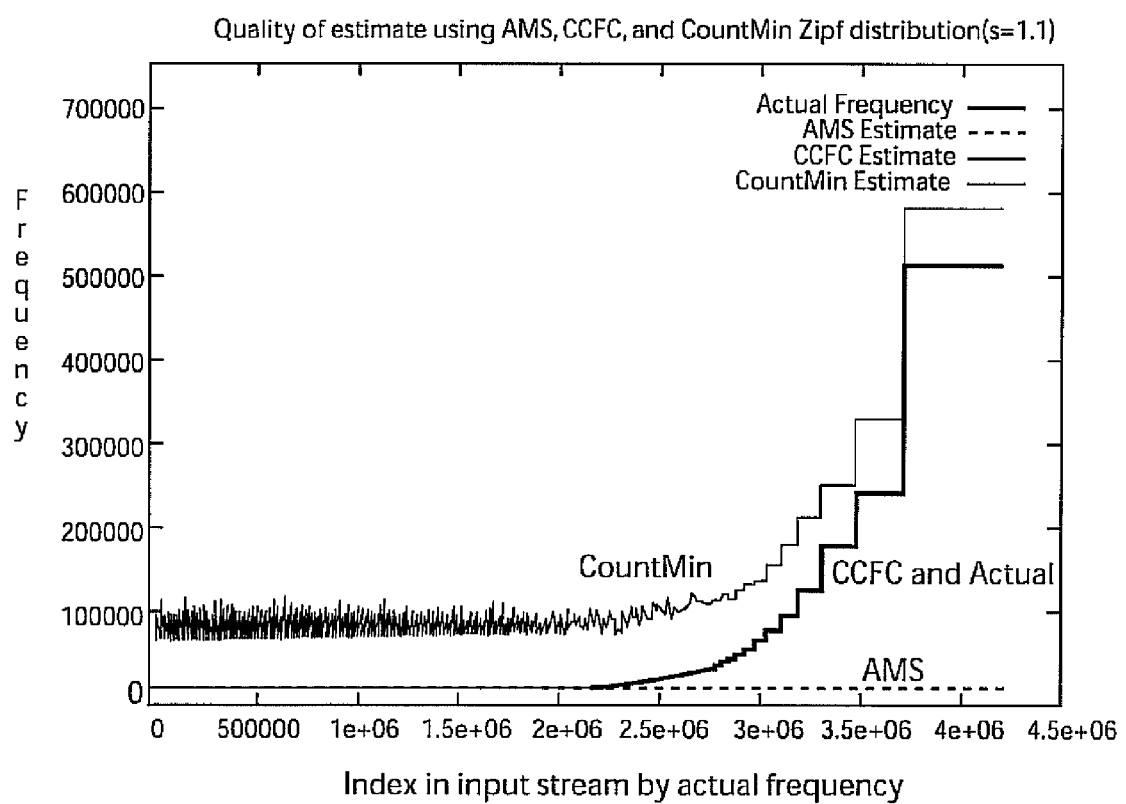
FIG. 4 is a plot showing an evaluation of three selected counting methods on a 16 MB Zipf ($\lambda$=1.1) dataset.

Referring to FIGS. 3 and 4, results for the Normal (σ=20) and Zipf (λ=1.1) datasets are illustratively shown comparing the three algorithms. The X-axis represents the input data set sorted using the actual frequency and Y-axis represents the frequency calculated by various algorithms. Evaluation of the three selected counting algorithms is on a 16 MB Normal dataset. As FIGS. 3 and 4 illustrate, for both datasets, for the entire frequency range, the CCFC algorithm computes the best approximations while the AMS algorithm performs the worst. The quality of approximation by the CM algorithm improves as the item frequency increases. However, the CCFC algorithm requires far more space ($\log(8n/\delta\epsilon^2)$) than the CM algorithm ($\log(e/\delta\epsilon)$) and its space consumption increases quadratically ($O(1/\epsilon^2)$) as the error parameter ($\epsilon$) is reduced.

In our experiments, the CM sketch required only 1536 bytes whereas the CCFC sketch used 51816 bytes and the AMS sketch used 83816 bytes. Furthermore, the CCFC performance degraded substantially when run with space comparable to the CM algorithm (for the Normal (σ=20) data, the average error per unique items increased from 0 to 30693, and for the Zipf (λ=1.1) data, from 150 to 7100). Among the three algorithms, the CM algorithm provides the best accuracy while consuming the lowest space and its space consumption increases linearly as the error parameter $\epsilon$ is reduced (unlike CCFC, where the space consumption increased quadratically). Therefore, the Count-Min (CM) algorithm was selected in one embodiment as the basis of the sequential kernel. It is to be understood that other algorithms including those described or others may also be employed with the scope of the present principles.

As noted above, the Count-Min (CM) algorithm is more accurate for approximating frequencies of high-frequency (heavy hitter) items. The CM algorithm uses a sketch with d hash functions of range w (it can be viewed as a table with d rows and w columns), and for every item to be inserted, uses every hash function to select a position in the corresponding row and increments its value by 1. At query time, the count estimate of an item is computed as the minimum of values stored in the corresponding positions in all d rows. This approach causes the low-frequency counts to be tainted due to the collisions between the low- and high-frequency items. The Count Sketch (CCFC) algorithm addresses this problem by considering additional hash functions to partition the d hash functions into two disjoint subsets and update the subsets differently.

The CCFC sketches are at least a factor $$\frac{1}{\varepsilon}\log(n)$$

larger than the CM sketches. Hence, we need a different strategy for reducing collisions using this method.

Frequency-aware Sketch Processing: Frequency-aware sketch processing will illustratively be described. Given an error bound $\epsilon$ and a probability bound $\delta$, FCM preferably uses the same sized sketch data structure as the CM algorithm.

Figure 5:
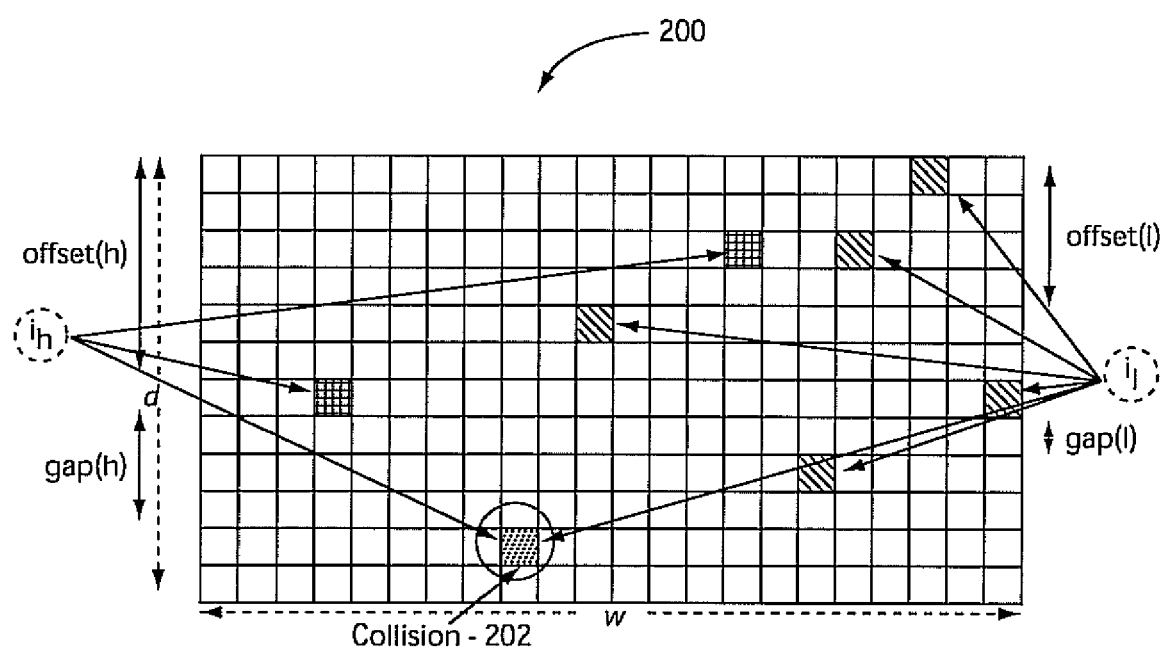
FIG. 5 is a diagram showing a frequency-aware counting method sketch structure where high frequency items update fewer hash functions/tables than low-frequency items.

Referring to FIG. 5, a FCM sketch 200 is a set of d uniform pairwise independent hash functions, each with the range w. The universal hash functions may be employed for computing hash values (i.e., hash(x)=(a·x+b)mod(P), where a and b are constants and P can be either $2^{31}-1$ or a large number). In contrast to CCFC, the FCM sketch uses a variable number of hash functions for an item based on its current frequency phase. An item, when deemed as a high-frequency item, uses fewer hash functions than a low-frequency item. To reduce the number of collisions further, a subset of the d hash functions is updated per item. The subset is chosen as a hash value of the item using two additional hash functions: first one is used to compute an initial offset into the d rows and the other computes a gap between consecutive hash tables, and the subset is chosen in a round-robin fashion. This approach differs from the CM sketch where every item updates all rows of the sketch beginning with the first row. For example, FIG. 5 illustrates the ingestion of a high-frequency item $i_h$ and a low-frequency item $i_l$ into the FCM sketch. Both $i_h$ and $i_l$ have different initial offsets and gaps. The low-frequency item $i_l$ uses more hash functions (6 functions) than the item high-frequency $i_h$ (3 functions). Even with these schemes, there may be a collision 202 between the two items.

Misra-Gries Frequency Counter: As the frequency of a stream item can dynamically change over time, FCM determines a frequency phase (i.e., high or low) of a stream item over the section of the stream processed so far. For dynamically detecting relative frequency phase of a stream item, we employ a space-efficient counter based on the Misra-Gries (MG) algorithm, which is known in the art. The MG algorithm approximates the set of k heavy hitter items from an online stream using k·log(k) space. At any point in the stream, the algorithm tracks those items whose frequency is more than 1/k for some constant k, and returns an over-approximation of the set of items that satisfies this condition. k is the window size on the stream being analyzed and may be selected in accordance with user or system criteria.

Figure 6:
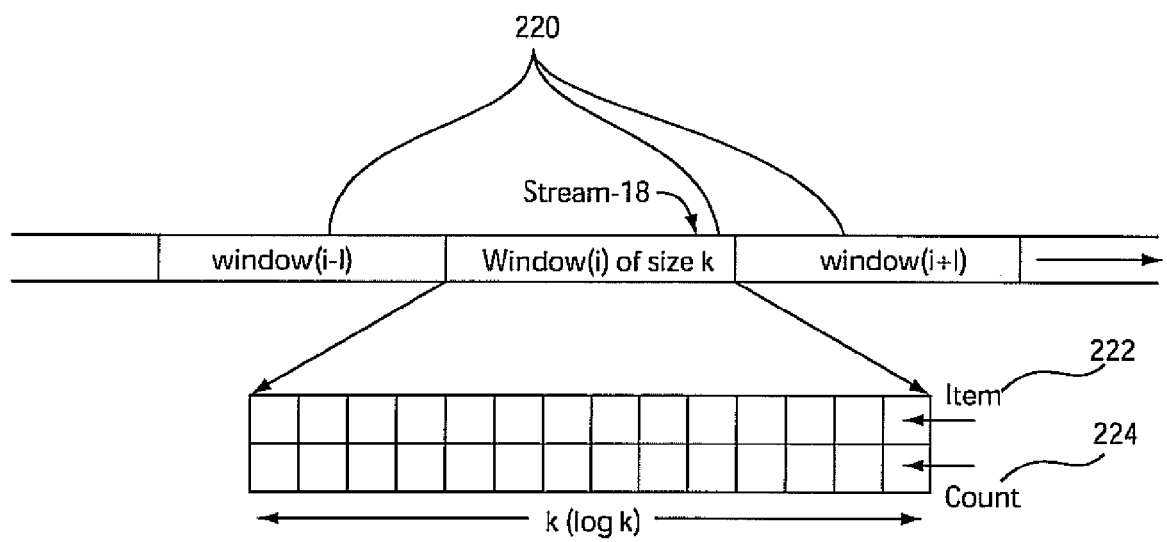
FIG. 6 is a diagram showing a dynamic frequency-phase detection using a Misra-Greis (MG) counter.

Referring to FIG. 6, a diagram showing dynamic frequency-phase detection using a Misra-Greis (MG) counter is illustratively depicted. In one implementation, a list of <item, count> pairs, called the MG counter, are employed to keep track of counts of unique items. The input stream is divided into windows 220 of size k. When an item 222 is being processed, we first check if it is in the counter. If the item is in the list, its count 224 is incremented. Otherwise, a new entry is inserted with an initial count depending on the index i of the window 220 being read. After i·k items have been processed, that is, after the $i^{th}$ window, any item with count less than (i+1) has frequency less than 1/k and so is deleted from the list. While processing the $(i+1)^{th}$ window, if a new entry is observed then its initial count is set at i, which is the maximum number of occurrences of the item, after which the entry could have been deleted from the list. This initial count ensures that an entry whose frequency is greater than 1/k is not missed.

However, this approach may introduce false positives. The efficacy of the MG counter depends on the input distribution and the constant k. FCM classifies an item as a high-frequency item if it is present in the MG counter. A threshold value can be set for the number of items being processed to prevent items from early sections of the stream being classified as high-frequency items. This classification is then used to differentially fill in the FCM sketch.

Figure 7:
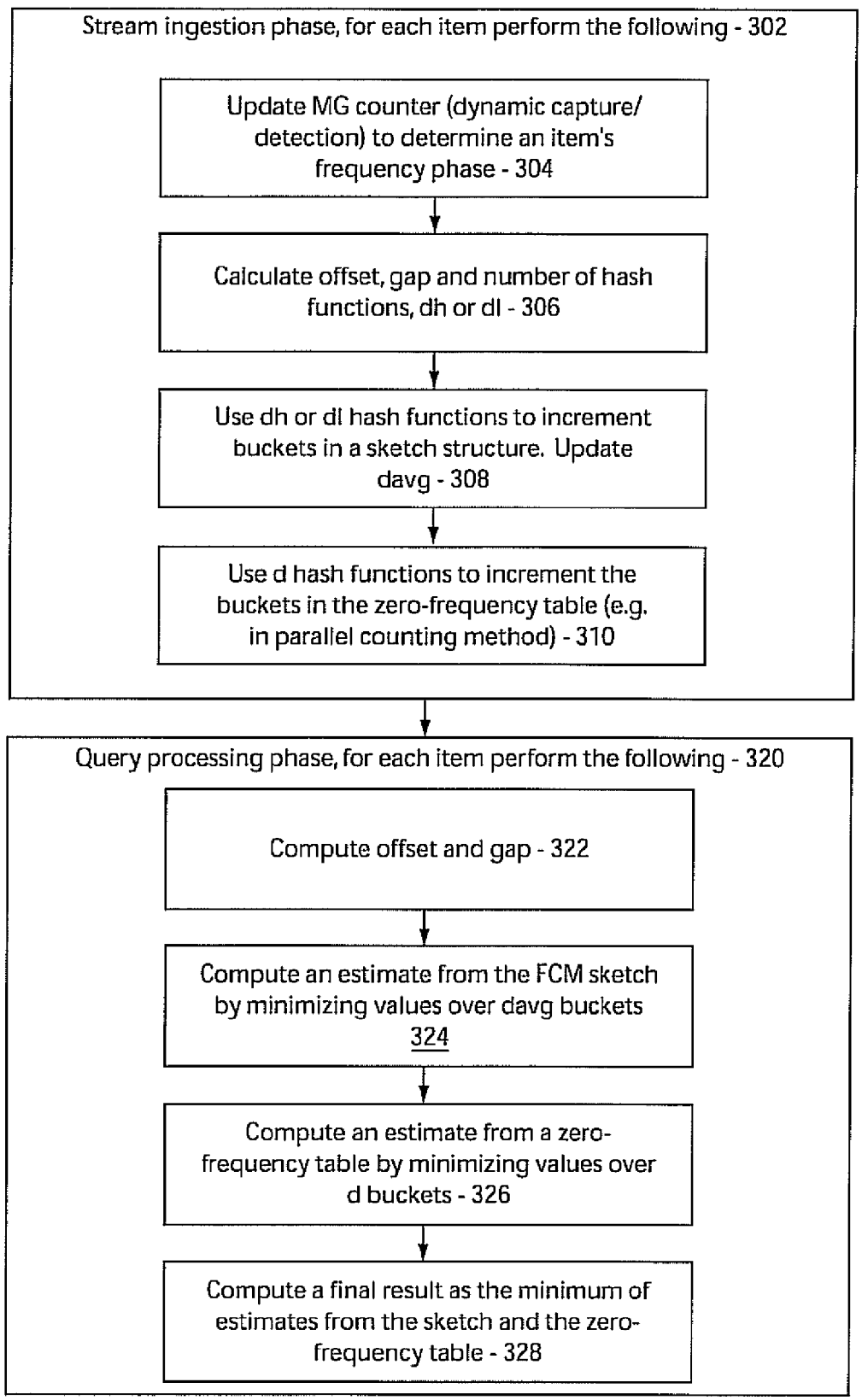
FIG. 7 is a block/flow diagram showing a system/method for a frequency-aware counting method (FCM) in accordance with one embodiment.

Referring to FIG. 7, an FCM Sketch Updating and Querying system/method is illustratively shown. In block 302, a stream ingestion phase is provided. For every item i in a stream, the following is performed. In block 304, update an MG Counter to determine the item's frequency phase. In block 306, determine an offset gap and a number of hash functions, $d_h$ or $d_l$. In block 308, use $d_h$ or $d_l$ hash functions to increment buckets in a sketch. In block 310, update $d_{avg}$. In block 312, use d hash functions to increment the buckets in a zero-frequency table (e.g., used only in the parallel scenario).

In block 320, a query processing phase is provided. For the item i in a point query, the following are performed. In block 322, determine the offset gap. In block 324, compute an estimate from the FCM sketch by minimizing values over $d_{avg}$ buckets. In block 326, compute an estimate from the zero-frequency table by minimizing values over d buckets. In block 328, compute a final result as the minimum of estimates from the sketch and the zero-frequency table.

In other words, given an item q in the ingestion phase (302), we first check if q is present in the MG counter (block 304). If the item is in the counter, we treat it as a high frequency item and choose a fraction, $d_h$, of the d hash tables to fill in. Otherwise, if the item is not in the counter, we choose a larger fraction, $d_l$ ($d_l \leq d_h$), of the d hash tables to fill in. We use the value of the item to be inserted for computing the offset and gap (block 306). These values are computed using uniform and pairwise independent hash functions, each with range [1 . . . d]. Given an item, we first calculate its offset and gap, and in a round robin fashion, identify $d_h$ or $d_l$ hash tables to fill in. To minimize self-collisions during the round-robin updating of the hash tables, we choose a prime value for d. For each chosen hash table, the item is hashed into a bucket i, 0<i<w, and the count in the bucket is incremented by 1 (block 308). Since the frequency phase of a stream item can vary dynamically during the stream ingestion process, we also keep track of the average number of hash functions used by the unique items ingested so far in the sketch, $d_{avg}$.

Once the data stream has been analyzed and a sketch has been constructed, we query (Query Phase 320) the sketch to answer point query estimates. Given a query item q, using the same hash functions, we compute its offset and gap, and using the same round robin fashion, $d_{avg}$ hash tables are chosen from the computed offset (block 322). For each table, the appropriate bucket i is selected using the corresponding hash function employed during ingestion. The value in the bucket i is then returned as an estimate of the count of the item. Among the $d_{avg}$ counts obtained, we return the minimum value as the final count estimate for the item q from the sketch (block 324). This approach differs from the CM sketch where the final result is computed as the minimum of d counts.

An estimate from the zero-frequency table is made by minimizing values over d buckets (block 326). A final result is computed as the minimum of estimates from the sketch and the zero-frequency table (block 328).

Error Analysis: In CM sketch, there is no differential filling of the sketch for high and low frequency items. Hence, $d_l=d_h=d$, and $d_{avg}=d$. We observe that the error bound in FCM has a tighter bound compared to that for the CM sketch. Further, the weight assigned to the count of high frequency terms, is smaller as $d_h<d_l<d$. Hence, the effect of high-frequency items polluting the sketch estimates for other items is reduced.

Reducing errors in estimating counts of absent items: One of the fundamental problems in all existing probabilistic counting algorithms is their lack of preserving precise history of the processed stream items. This results in their inability to identify absent (zero-frequency) items, irrespective of the size of the sketch being used, and leads to significant errors while estimating counts for such items. Existing approaches for detecting absent items use probabilistic data structures like Bloom Filters, which are known in the art. While Bloom filters are fairly accurate, they consume far more space than the FCM sketch. (A well-implemented Bloom filter with 1% false positive rate requires on average 9.6 bits per item). Given limited memory availability, the FCM aims to reduce the magnitude and frequency of errors in estimating counts of zero-frequency items. For this purpose, the FCM uses an additional sketch data structure called a zero-frequency table.

Figure 8:
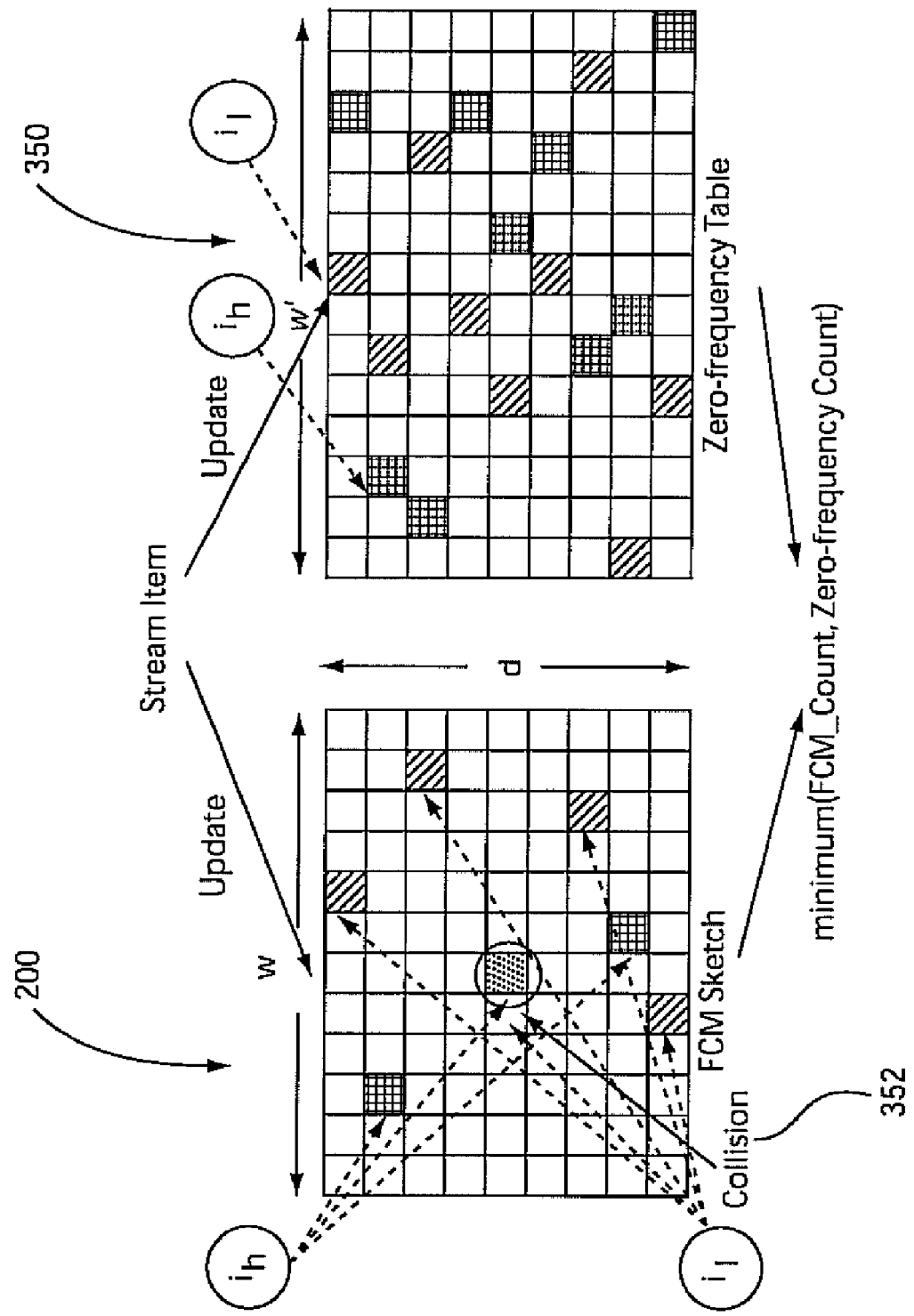
FIG. 8 is a diagram showing an FCM sketch structure and a zero-frequency table for reducing estimation errors due to absent items.

Referring to FIG. 8, an FCM sketch 200 and a zero-frequency table 350 are illustratively shown for reducing estimation errors due to absent items. One important idea is to ensure that a hash table collision (352) between two items in the FCM sketch 200 does not repeat in the zero-frequency table 350. For example, if items x and y map to the same hash bucket i using a hash function $h_j$ in the FCM sketch 200, they do not map to the same bucket when using a different hash function $h_k$ in the zero-frequency table 350.

The zero-frequency table 350 is also a sketch with d uniform pairwise independent hash functions, each with the range w', where w'=w+δ. Let the $i^{th}$ hash function in the FCM sketch 200 be $h_i(x)=((a_i \cdot x+b_i) \mod(P)) \mod(w)$. Then, the $i^{th}$ hash function in the zero-frequency table 350 is chosen as $h_i'(x)=((a_i \cdot x+b_i) \mod(P)) \mod(w')$. δ is chosen as O(w), and δ and w are co-prime. This implies w and w'=w+δ are relatively prime as well.

While ingesting a stream, the FCM updates both the sketch 200 and zero-frequency table 350. However, unlike in the sketch 200, irrespective of its frequency phase, all d hash functions of the zero-frequency table 350 are used. For every row j, 0<j≤d, the item is hashed into a bucket i, 0<i<w+δ, and the count in the bucket is incremented by 1 (see, e.g., block 310 of FIG. 7).

Now consider a hash function $h_1(x)=((a_1 x+b_1) \mod(w))$ for the data points $x_1$ and $x_2$ in the FCM sketch. A collision occurs in the sketch only if $a_1 \cdot (x_1-x_2)$ is divisible by w. For the same data points, a collision occurs in the zero-frequency table only if $a_1 \cdot (x_1-x_2)$ is divisible by w'. Since w and w' are relatively prime, this implies that for a collision in both tables, $a_1 \cdot (x_1-x_2)$ is divisible by w·w'. For uniform hash functions, this happens with probability 1/(w·w'). We note that we are using space proportional to w+w' and instead of collisions with probability 1/(w+w'), we are now getting at least one table without a collision with probability 1/(w·w').

During a point query, an estimate is computed from the FCM sketch 200 by minimizing over $d_{avg}$ hash functions. A similar estimate is computed from the zero-frequency table 350 by minimizing over d hash functions (see block 326 in FIG. 7). The final estimate for the point query is computed as the minimum of the FCM estimate and the zero-frequency estimate (block 328 in FIG. 7). As the final value is the smaller of the two estimates, the result can be either 0 (i.e., there was no conflict in either or both data structures) or the smaller value (i.e., there was conflict in both data structures). However, in both cases, the error in estimating the count of a zero-frequency item would be less than that for the CM sketch. Thus, using the frequency-aware sketch updating and the zero-frequency table, the FCM improves the estimate accuracy for both the low-frequency and zero-frequency items.

Figure 9:
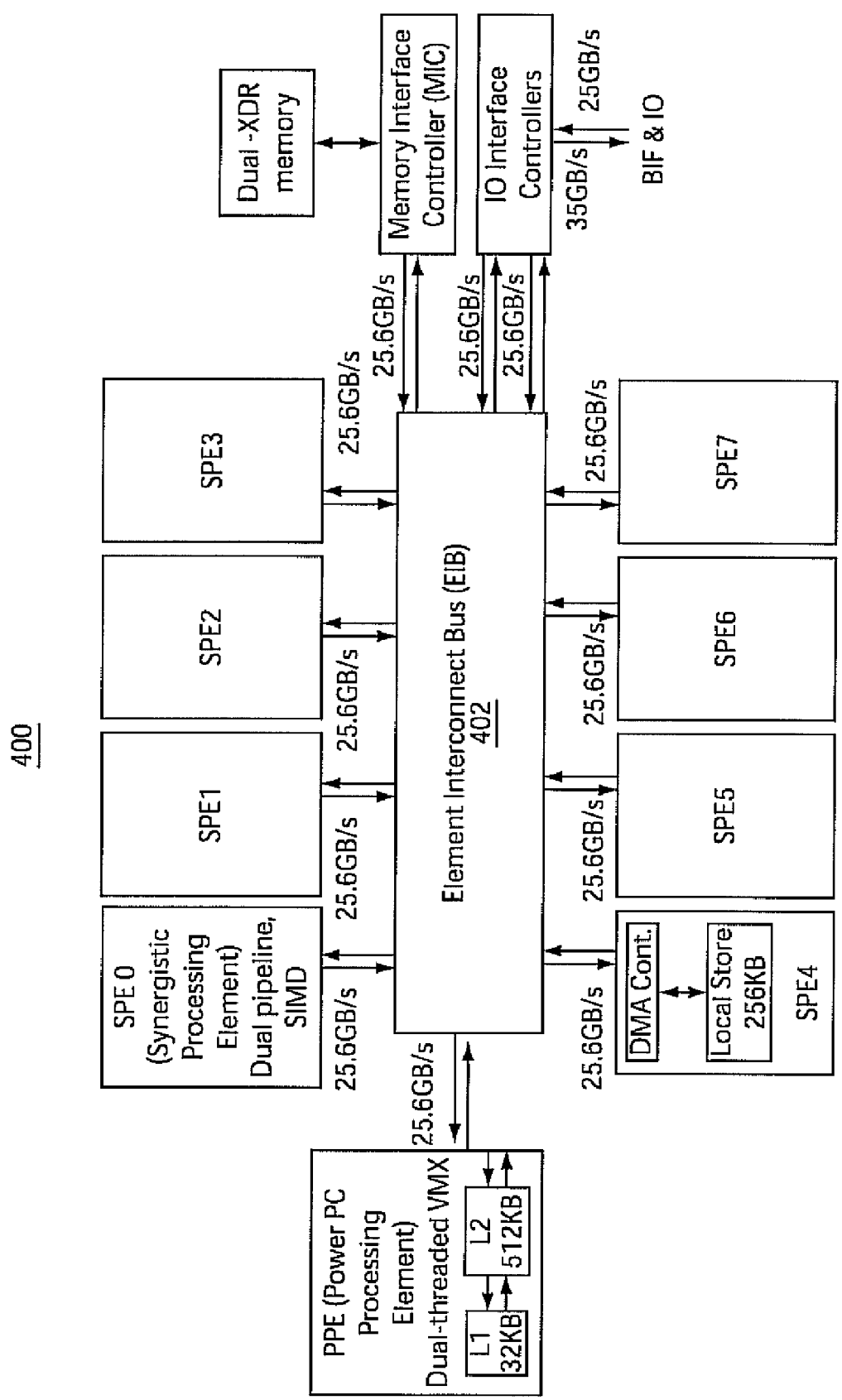
FIG. 9 is a block diagram showing a multiprocessor architecture, e.g., a Cell process, in accordance with the present principles.

Referring to FIG. 9, an illustrative cell processor 400 is illustratively shown for implementing the present principles. The cell processor 400 is designed primarily for compute- and data-intensive streaming applications. Processor 400 may be a 64-bit single-chip heterogeneous multiprocessor with nine processing cores: one general-purpose processor, called a Power PC Processing Element (PPE) and eight special purpose co-processors, called Synergistic Processing Elements (SPEs) (SPEs 0-7). Both the PPE and the SPEs run at the same clock frequency. These processors are connected via a high-bandwidth internal bus 402 and can access a shared, coherent main memory 404. The PPE may include a PowerPC-based RISC core and runs an operating system to manage system resources of the entire multiprocessor 400. The PPE may include a 32 kB instruction and data L1 caches, and a 512 kB integrated L2 cache. Each SPE may also include a 64-bit RISC core natively supporting a short-vector 128-bit single-instruction multiple-data (SIMD) instruction set. The Cell SPE may be a dual-issuer statically scheduled SIMD processor. Each SPE holds a 126-entry 128-bit register file to execute these SIMD instructions. The SPE SIMD instruction set can support multi-way (2, 4, 9, and 16) data parallelism. The SPE control unit can issue 2 instructions per cycle, in-order. Instead of caches, each SPE has a 256 kB private local store 408 which is used to hold both instructions and data. The SPE load and store instructions manage the data transfer between the register file and the local store. Each SPE has dedicated single-precision floating point and integer vector units. Although designed primarily as a SIMD processor, the SPE can also execute scalar computations. However, as the SPEs may lack branch prediction hardware, execution of scalar SPE code with conditionals may not be optimal. Finally, there is no virtual-memory support on the SPEs in the presented embodiment and the only way to access the main memory from the SPEs is via explicit asynchronous direct memory access (DMA) commands. The DMA is also used for communicating among different SPE local stores. The PPE and SPEs have different instruction-set architectures (ISAs) and the Cell compiler automatically generates the appropriately optimized native code.

The Cell's multi-core architecture can be exploited via a variety of parallel programming models. A Pthreads like task-parallel programming model enables a host program executing on the PPE to spawn multiple threads which can execute different programs on different SPEs. Each SPE program can then use the SIMD instructions to exploit Cell's data parallel facilities. The SPE code performance can be further improved by using instruction-level parallelism via SPE's dual execution pipes. The Cell also supports a shared-memory programming model where multiple SPEs can share data from their local stores using DMAs over a distributed shared address space. Other supported programming models include function offloading and computation acceleration models.

Implementing the parallel counting algorithm on the Cell: The Cell implementation of the parallel counting method uses a master-slave approach using the Cell's task-parallel programming model. This approach may also be used for programming network processors. The present implementation divides the work between the PPE- and SPE-based components. The sequential PPE code acts as the coordinating processor, and loads the SPE code into individual local stores and then invokes sequential counting kernels on one or more SPEs. The PPE code reads the stream data and partitions it using either block- or hash-based partitioning schemes. At the query processing time, the PPE propagates the query to the participating SPEs, collects the results from these SPEs and returns the final result.

Each participating SPE code executes the core sequential counting kernel (e.g., the FCM). The SPE implementation of the FCM uses the native 128-bit SIMD instruction set to accelerate a variety of key computational functions (e.g., the hash functions). The SPE code also uses extensive loop unrolling to enable instruction-level parallelism. The SPE kernel initializes key data structures in the 256 KB local store (e.g., sketch, zero-frequency tables, buffers for memory accesses, etc.). Once initialized, each SPE instance fetches its portion of the stream data via DMA from the main memory. The core ingestion method needs to be strip-mined as a single DMA can fetch only 16 kB of data at every invocation in the illustrative embodiment. The DMA memory-access calls use the double-buffering approach to hide the memory latencies. All operations on the data buffers are SIMDized as well. During the querying phase, the PPE multicasts a point query to the participating SPEs. The SPEs access their local data structures to compute local counts, and send them back to the PPE. The parallel counting method in accordance with the present principles does not require any inter-SPE communication during stream ingestion or querying. Other processing architectures which may include Cell or others are also contemplated.

Experimental Evaluation: We have evaluated the parallel counting method on the Cell using two sequential counting kernels: FCM and CM. We evaluated the implementations using 16 MB (4M integers) data with Zipf ($\lambda$=1.1, 1.5) and Normal ($\sigma$=10, 20) distributions under the error bound $\delta$=0.087, and the probability bound $\delta$=0.0002. Based on these parameters, for both the CM and FCM, we used a sketch with 17 hash functions (i.e., d=17) with the range of 31 (i.e., w=31). We used the same universal hash functions for updating the FCM and CM sketches. For these experiments, $d_h$ was set to d/2 and $d_1$ was set to $(4/5)d^2$. Each sketch needed 2108 bytes and the zero-frequency table needed 2356 bytes. The FCM also used a MG frequency counter with the stream window size k=8 (corresponding number of entries in the MG frequency counter was klogk=24). Note that the additional space needed by the MG frequency counter was substantially less than the CM or FCM sketch and FCM used the zero-frequency table only in the parallel scenario. For the FCM, the per SPE memory consumption was around 110 kB, which included the space of two data buffers, the sketch, zero-frequency table, the frequency counter, etc. The CM algorithm consumed slightly less SPE local space, as it did not use the MG frequency counter and the zero-frequency table. We ran our experiments on a 2.1 GHz Cell-based blade with a single Cell Broadband Engine (BE) Processor, with a single PPE and a SPEs.

Figure 10:
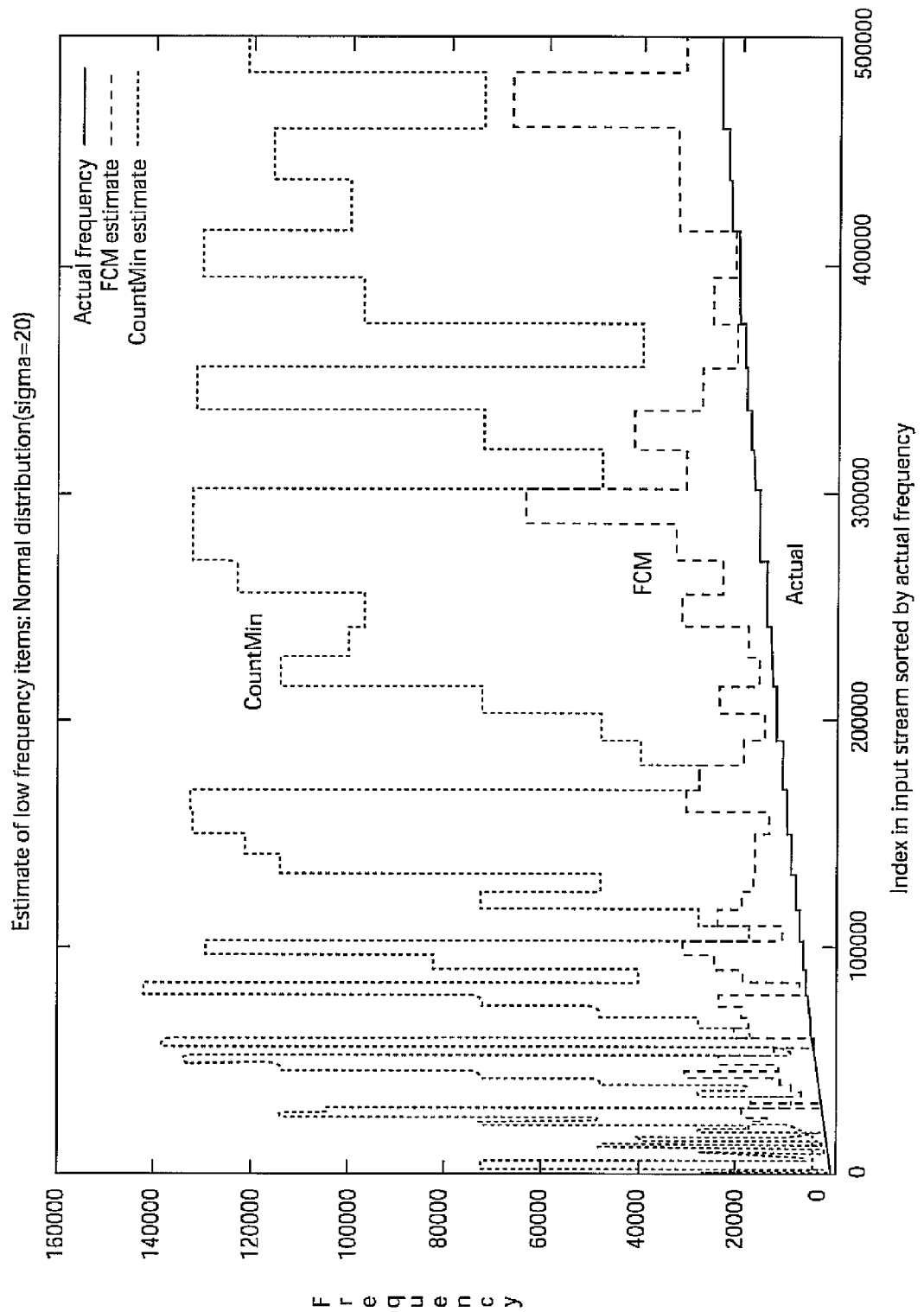
FIG. 10 is a plot comparing estimate quality between Count-Min (CM) and FCM for low frequency items in a Normal ($\sigma=20$) dataset.
Figure 11:
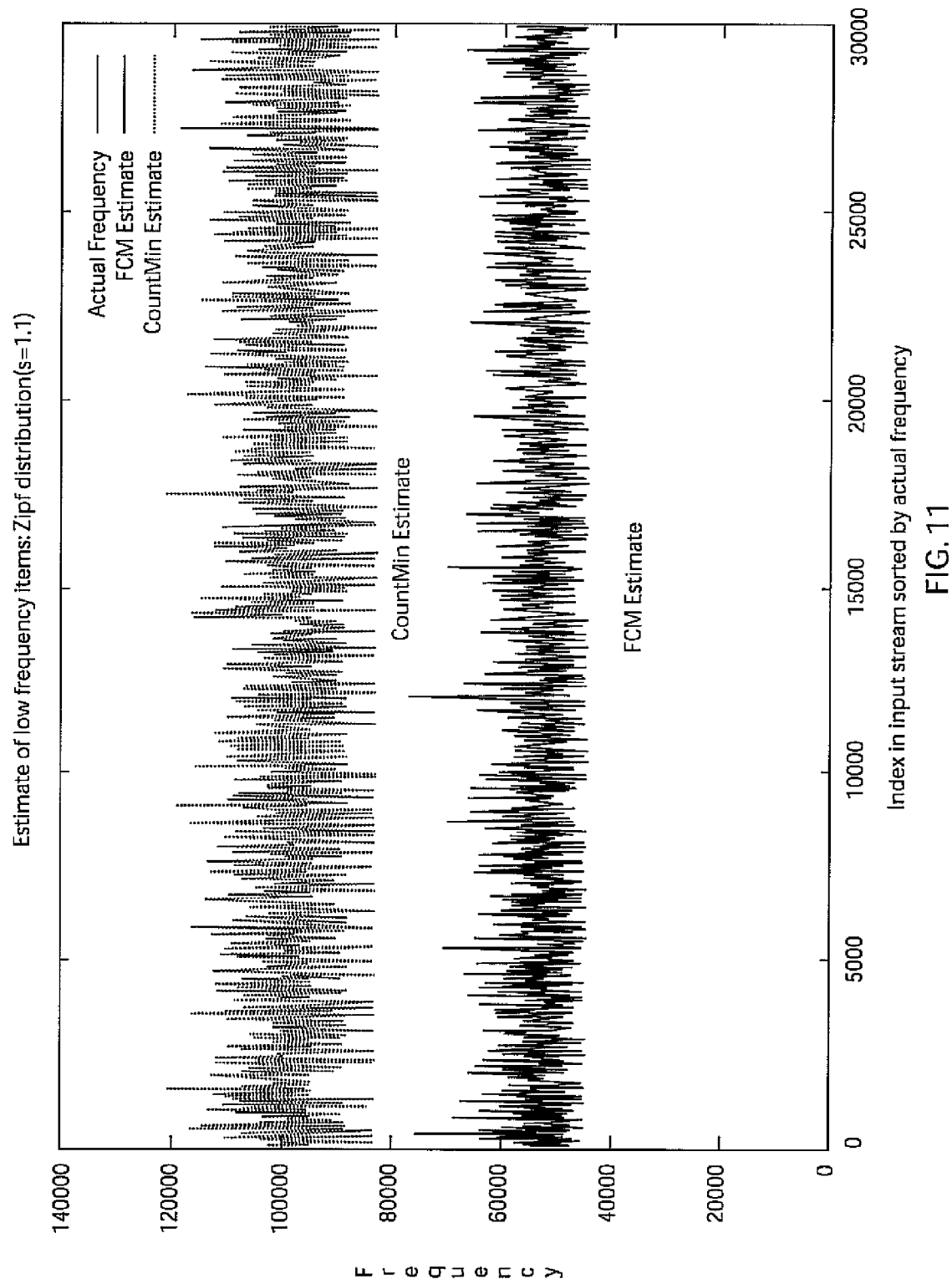
FIG. 11 is a plot comparing estimate quality between CM and FCM for low frequency items in a Zipf ($\lambda=1.1$) dataset.

Evaluation of the FCM: The first three experiments evaluate the FCM against the CM algorithm using a single SPE. FIGS. 10 and 11 present the CM and FCM estimates for the low-frequency range of the input datasets. As these graphs illustrate, while consuming similar amounts of space as the CM algorithm (FCM uses an additional 24-entry MG counter), the FCM estimates are closer to the actual frequency counts. These results validate using frequency-aware sketch updating to avoid collisions with high-frequency items. They also validate the application of the Misra-Greis frequency counter and the choices of $d_h$ and $d_l$.

Figure 12:
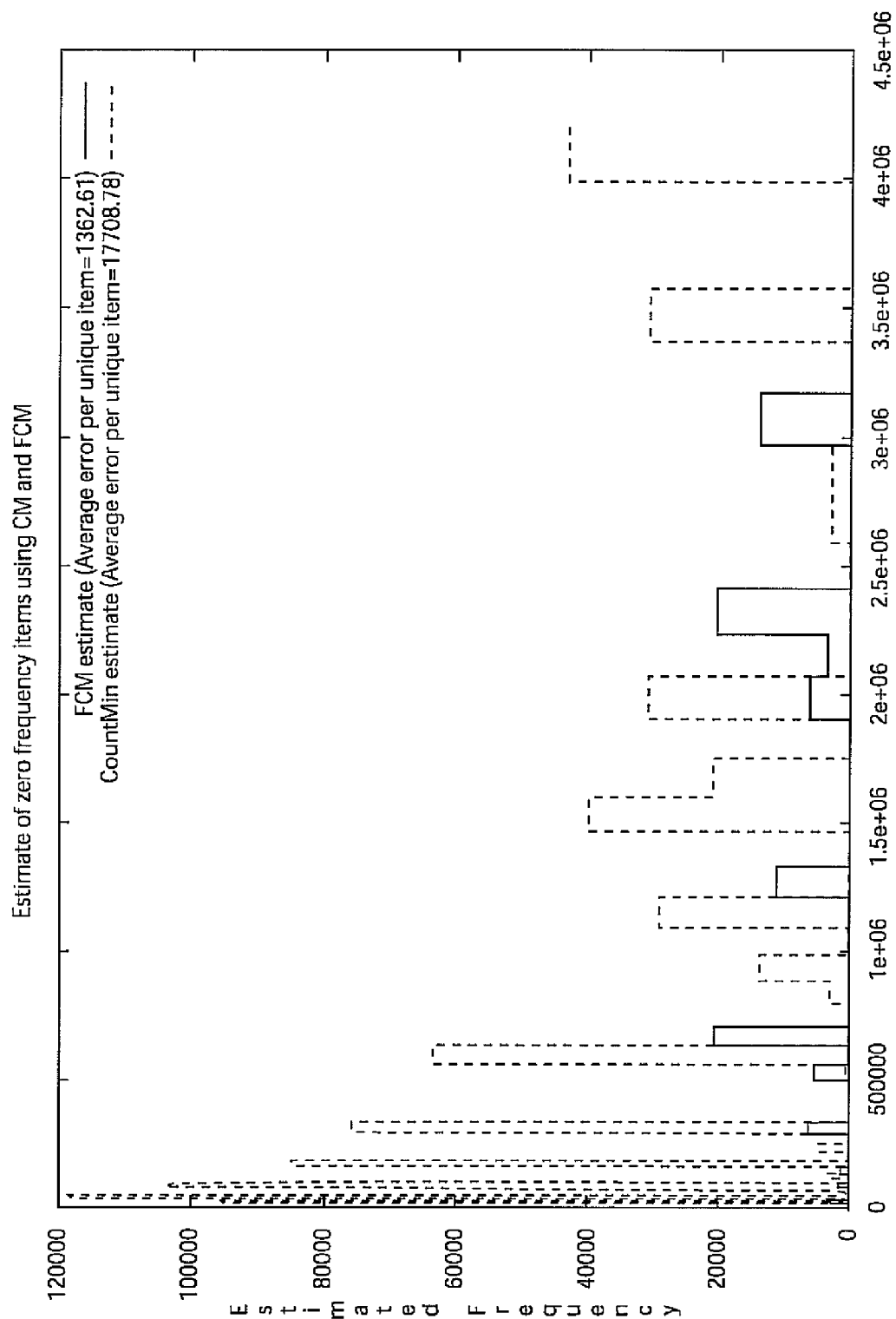
FIG. 12 is a plot evaluating a zero-frequency table using a Zipf ($\lambda=1.1$) dataset where the average error per unique item is calculated over the entire stream.
Figure 13:
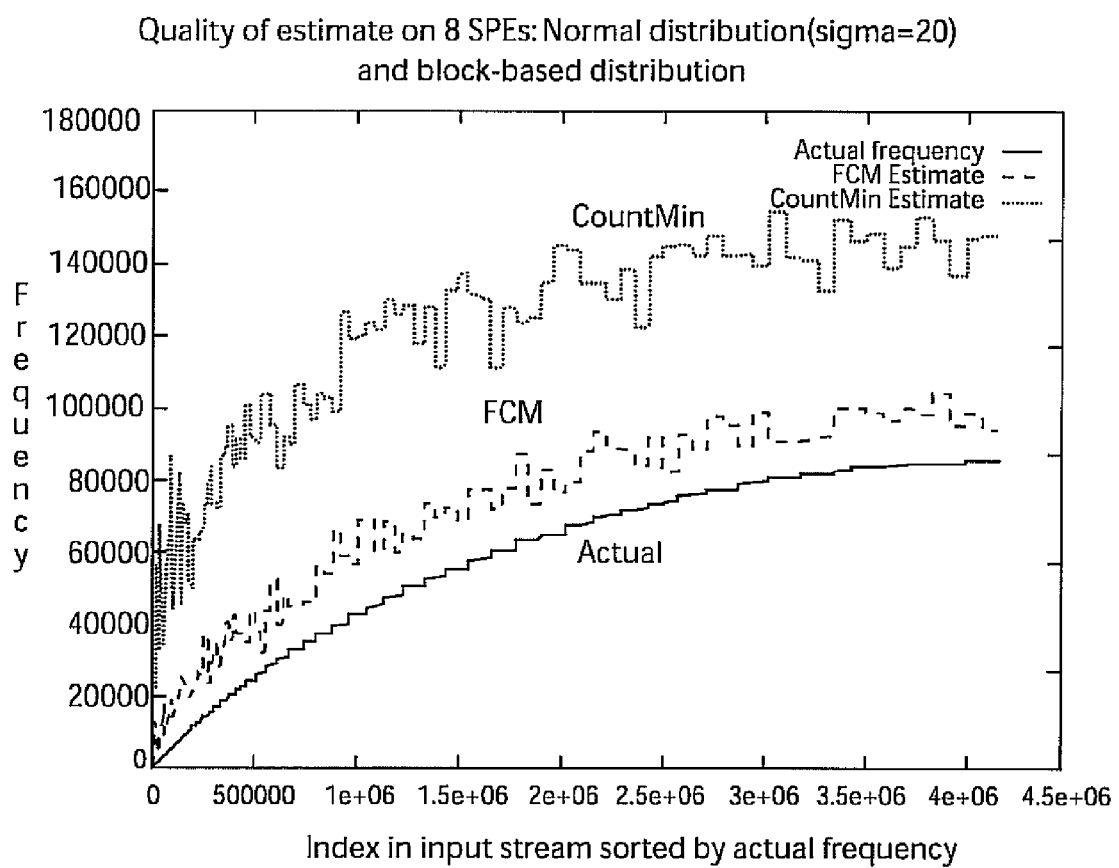
FIG. 13 is a plot showing quality of estimating Normal ($\sigma=20$) input using 8 processing cores (SPEs) via block-based data partitioning.
Figure 14:
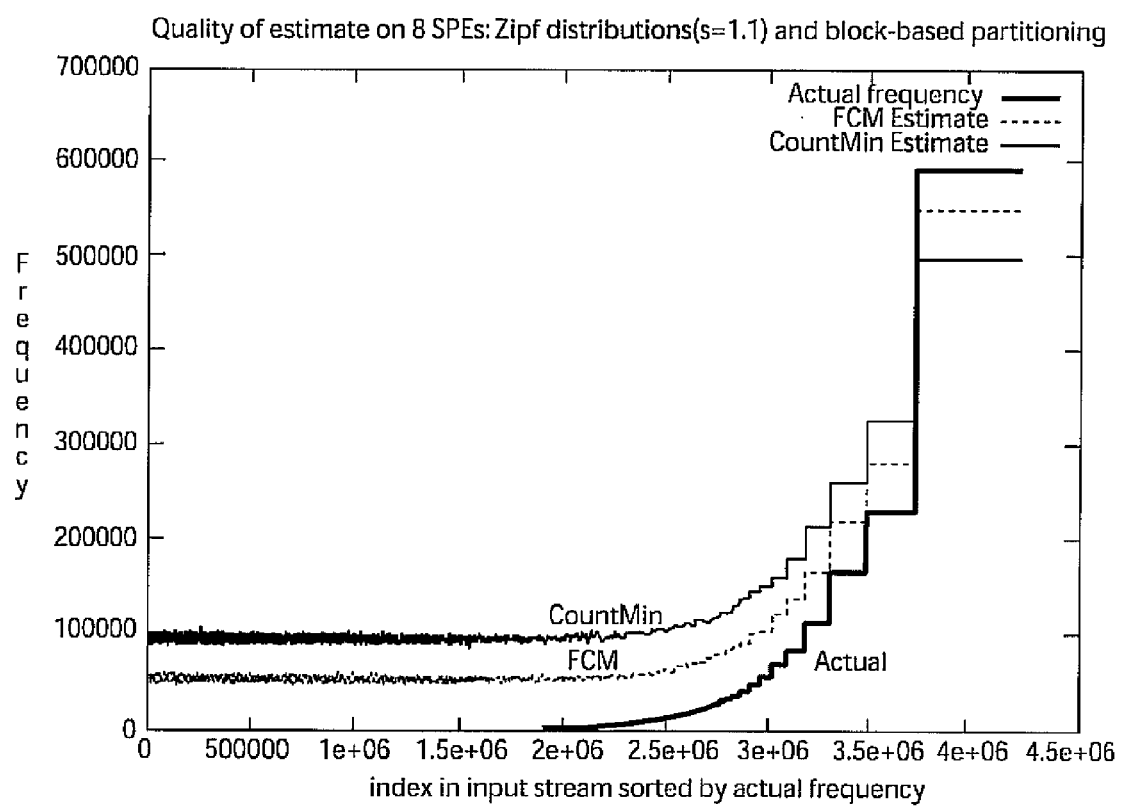
FIG. 14 is a plot showing quality of estimating Zipf ($\lambda=1.1$) input using 8 processing cores (SPEs) via block-based data partitioning.
Figure 15:
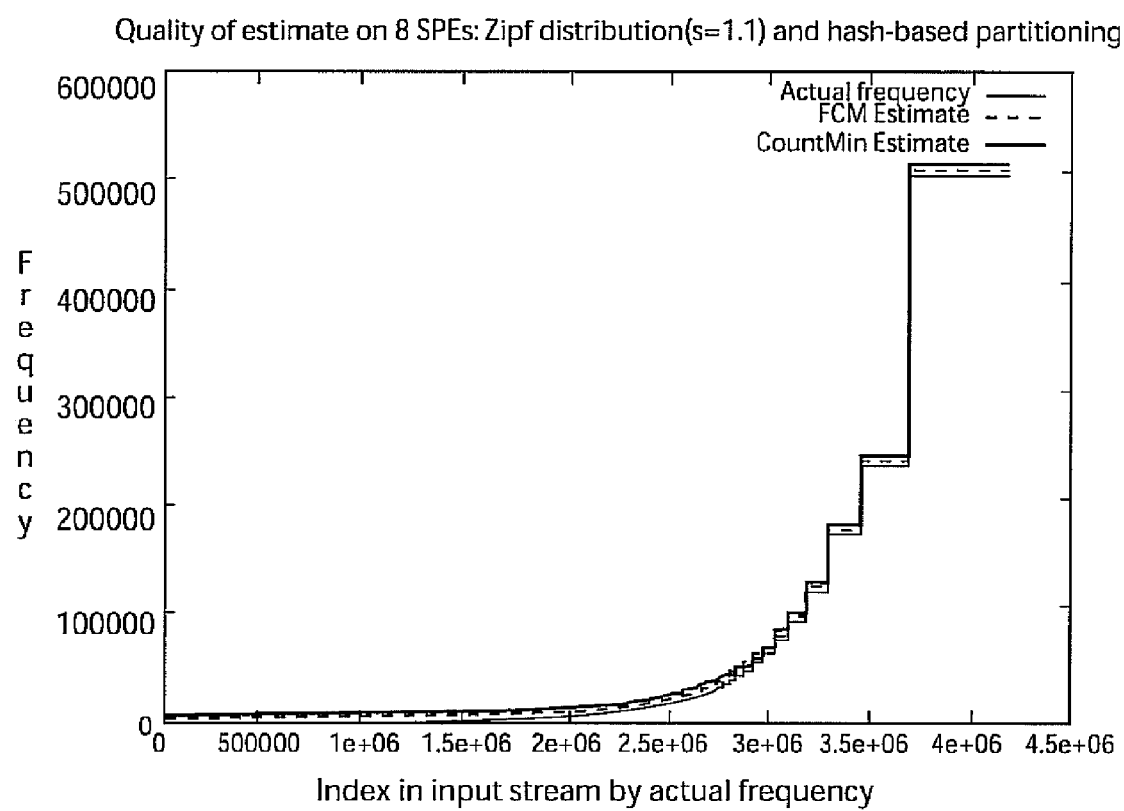
FIG. 15 is a plot showing quality of estimating Zipf ($\lambda=1.1$) input using 8 processing cores (SPEs) via hash-based data partitioning, where the normalized estimation error was reduced from 2.13 (for CM) to 1.13 (for FCM)
Figure 16:
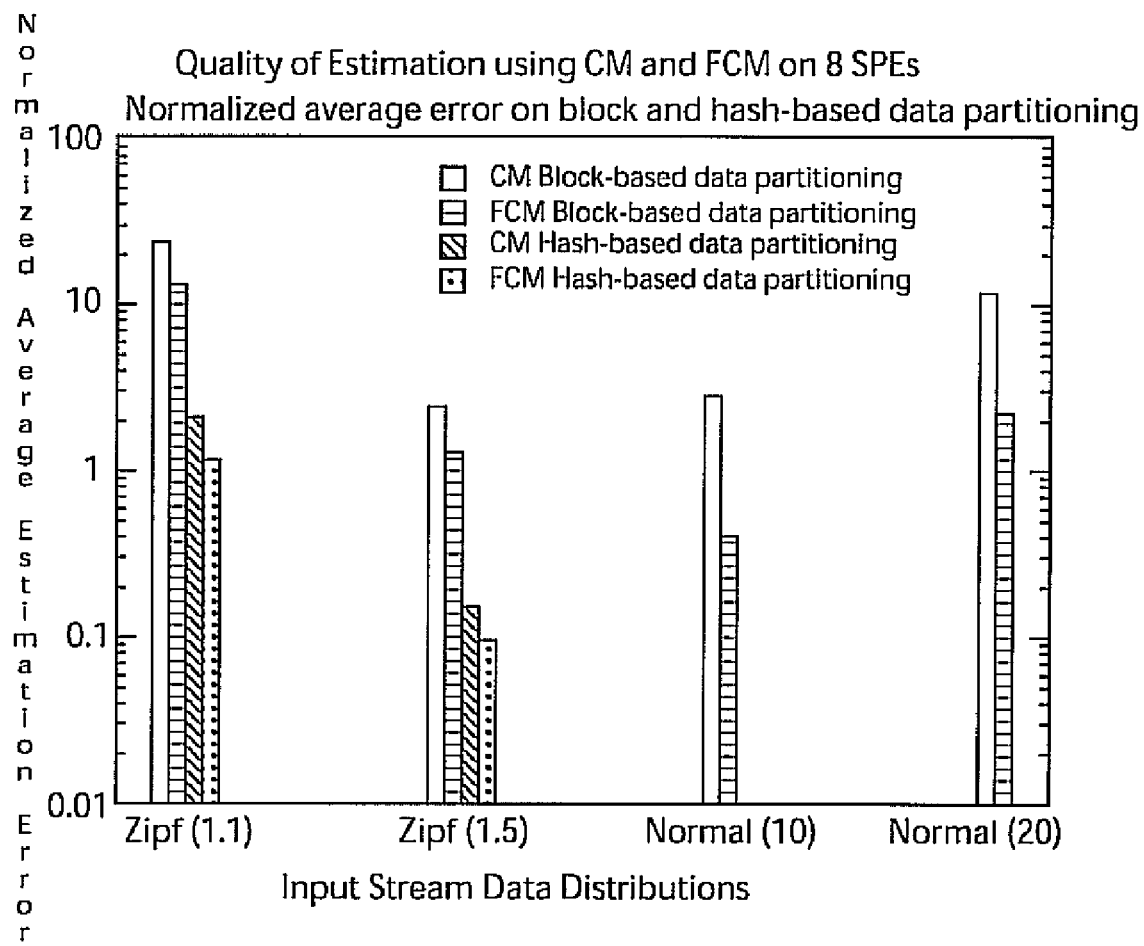
FIG. 16 is a chart comparing estimation quality for Zipf and Normal data distributions using block- and hash-based data partitioning, where the Y-axis is logarithmic and errors in estimating the Normal datasets using hash-based data partitioning are too small for representation.

FIG. 12 presents the behavior of the FCM and CM while estimating counts of absent items. In this experiment, the FCM and CM sketches were populated using the 16 MB Zipf dataset and then queried using items absent from the input dataset. FIG. 12 represents the frequency estimates of both FCM and CM calculated over the entire life-time of the input stream. The graph of FIG. 12 demonstrates that the errors in count estimates of the FCM are fewer and smaller than the CM. In fact, the average error per unique absent item for the CM was 13 times larger than that for the FCM. This result provides an experimental validation of the present approach of using a space-efficient zero-frequency table along with the sketch for reducing errors for absent items.

Evaluation of Parallel Counting Method: The following experiments evaluated the parallel counting method using the FCM and CM counting kernels. We scaled the number of SPEs from 1 and 8, and partitioned the data using block-based partitioning with 16 KB blocks and hash-based partitioning over 8 processor groups (each processor group had a single member). For the hash-based partitioning, we used the last three bits of the item value as the function for partitioning the input data set into 8 buckets. Each bucket was then assigned to a SPE. In this section, for evaluation purposes, we use average error per unique items normalized over a window of 1024 items.

FIGS. 13, 14, 15 and 16 illustrate the estimates for the Normal and Zipf datasets using the parallel algorithm over 8 SPEs. Each experiment is run using the CM and FCM as the sequential kernel with the block-based and hash-based data partitioning. As these graphs demonstrate, in most cases, the FCM substantially improves the estimation quality over the CM for the entire frequency range. The exception being the low-tailed Normal ($\sigma$=10, 20) datasets (FIG. 16), where FCM and CM estimates are very accurate due to fewer collisions among low- and high-frequency items. CM and FCM are using the same space for storing their sketches. FCM provides better estimation of low-frequency items and zero-frequency items. The reduced number of collisions among high- and low-frequency items in the FCM also improves the estimates of high-frequency items.

Further, for both FCM and CM, the overall quality of estimation improves when the stream data is partitioned using the hash-based partitioning scheme. There are at least three reasons for this improvement. First, when the stream data is partitioned using a hash-based partitioning scheme, all occurrences of a particular value are grouped together. Thus, the relative frequency of the items observed by a processor group increases. As the CM and FCM both provide good estimation of high-frequency items, the per-processor estimates improve substantially. (This effect was particularly prominent for the Normal datasets as displayed in FIG. 16). Second, as the data is partitioned only across a subset of processors, the error in the final estimate is bound by the number of processors in the processor group (in our experiment, one processor). Finally, when the processor group had only one processor, there were no errors due to zero-frequency items (in the general case, when the processor group has more than one processor, hash-based partitioning would experience additional errors due to zero-frequency items). The combination of improved local estimates and aggregation over a smaller number of processors leads to substantial improvement in the final estimate.

Figure 17:
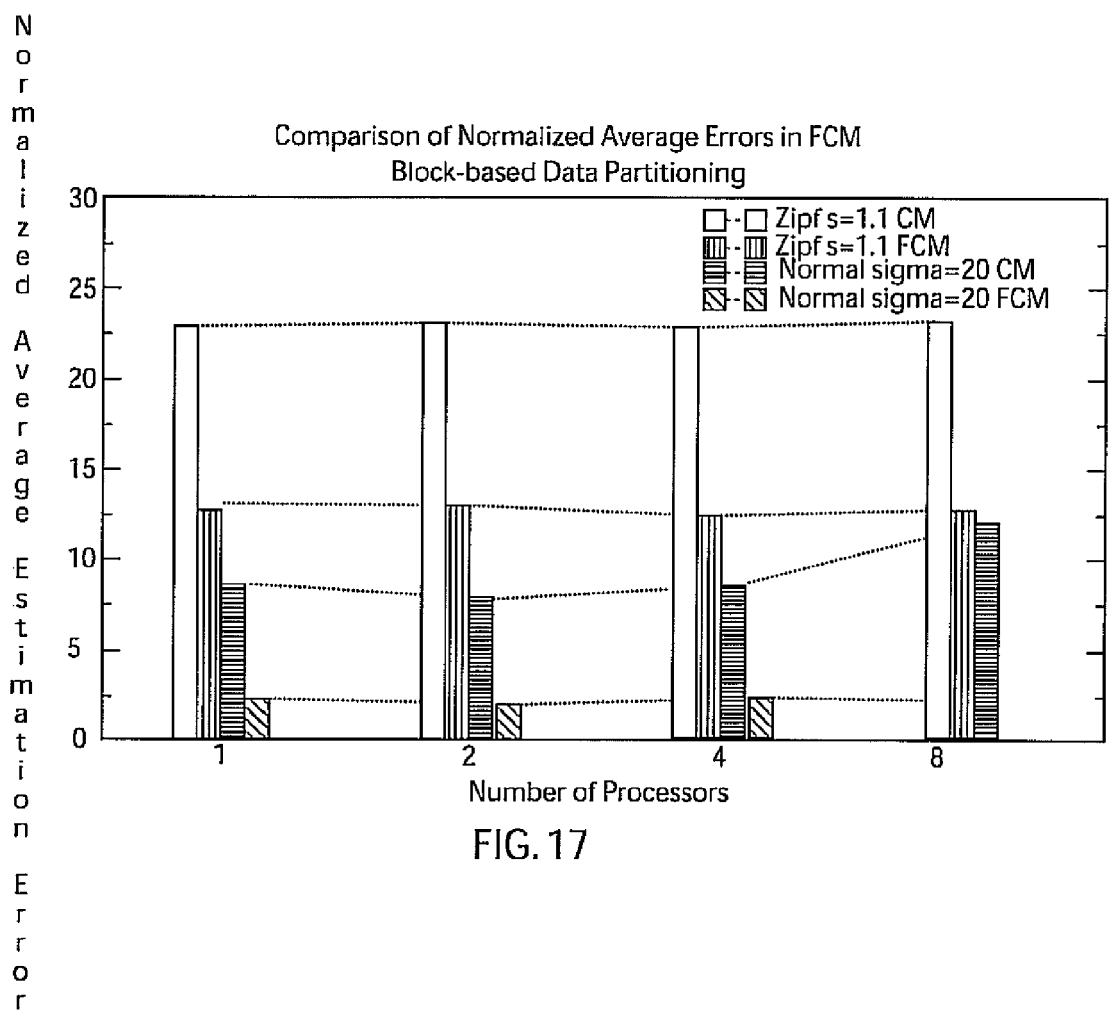
FIG. 17 is a chart comparing errors in FCM and CM using block-based data partitioning from Normal ($\sigma=20$) and Zipf ($\lambda=1.1$) datasets, where the number of SPEs is increased from 1 to 8.
Figure 18:
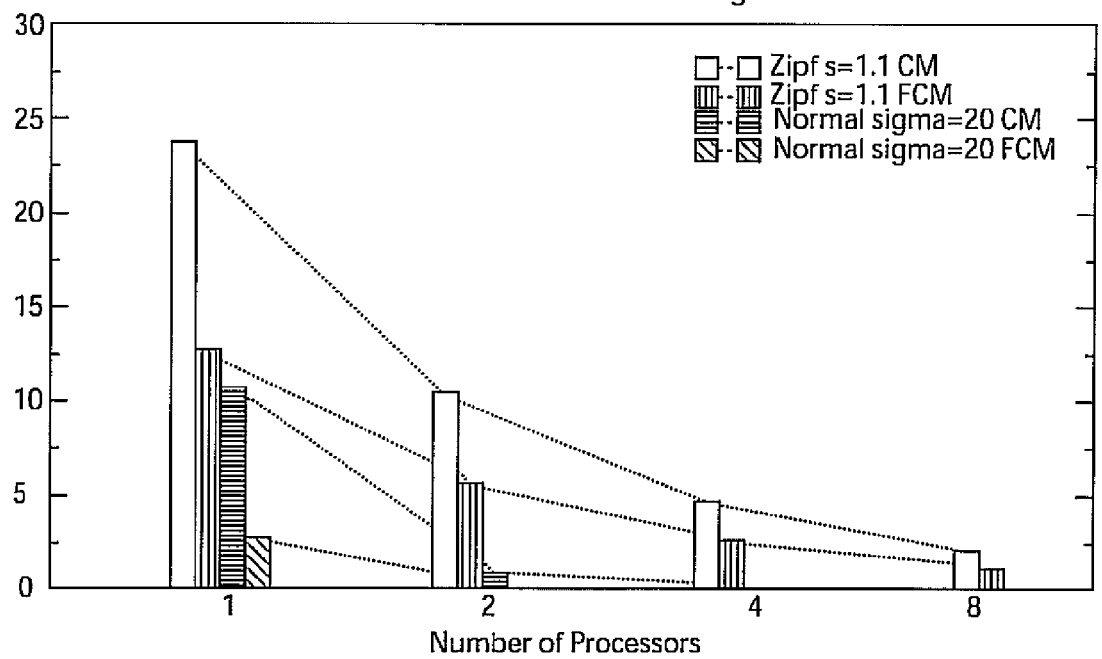
FIG. 18 is a chart comparing errors in FCM and CM using hash-based data partitioning from Normal ($\sigma=20$) and Zipf ($\lambda=1.1$) datasets, where the number of SPEs is increased from 1 to 8, and errors is estimating Normal datasets on 4 and 8 are too small for representation.

To further examine the effect of hash-based partitioning on the estimation errors, we measured the normalized estimation error for both block- and hash-based partitioning for both Zipf and Normal datasets while scaling the number of SPEs from 1 to 8 (FIGS. 17 and 18). As FIG. 17 illustrates, for the block-based partitioning, the normalized estimation error does not decrease as the number of SPEs is scaled up from 1 to 8. In fact, in one case, the error increases as the number of SPEs is increased. On the contrary, while using hash-based partitioning (FIG. 18), the normalized error decreases significantly as the number of SPEs is increased (for the Normal dataset, after 2 SPEs, the error is too small to be represented on the graph.).

Unlike the hash-based partitioning, the block-based partitioning does not group together items of the same value. Hence, the quality of local estimate is not as high as that for the high-frequency items (i.e., local errors are high). Also, the final result is calculated via aggregating local results over all SPEs in the system. Therefore, the local errors get accumulated, resulting in a significant degradation in estimation quality. Finally, for block-based partitioning, as the number of SPEs is increased, the impact of zero-frequency items on the estimation error increases as each point query is broadcast to all SPEs. FCM's ability to identify zero-frequency items mitigates this impact and unlike the CM algorithm, its estimate quality does not degrade as the number of SPEs is increased (FIG. 17).

Figure 19:
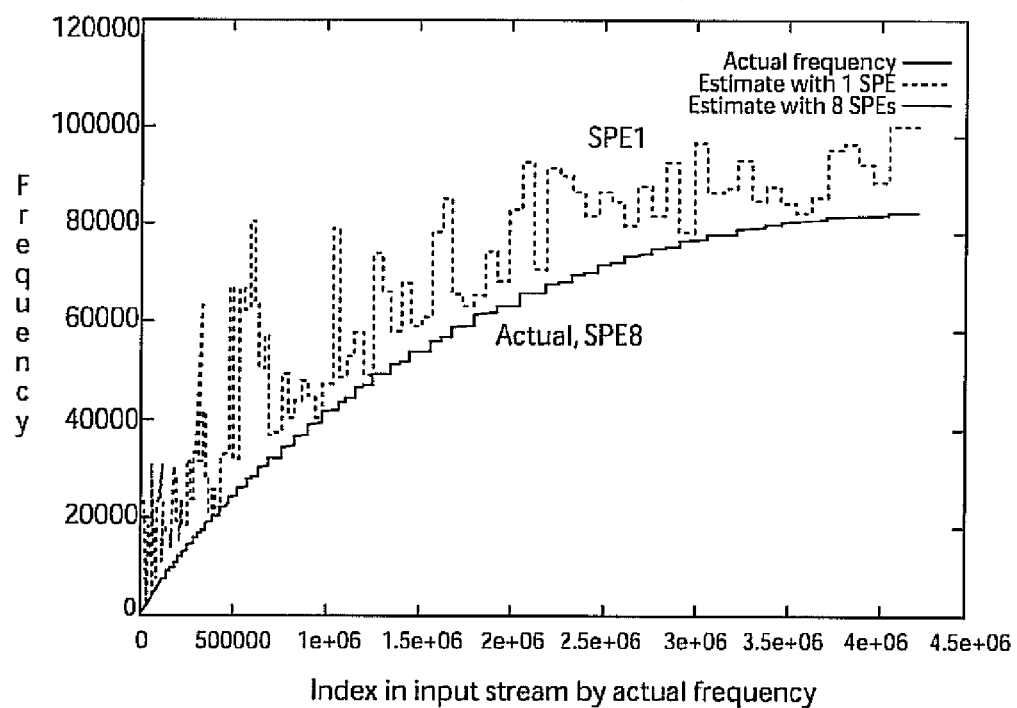
FIG. 19 is a plot comparing quality of estimation of Normal ($\sigma=20$) data using hash-based data partitioning over 1 and 8 SPEs.
Figure 20:
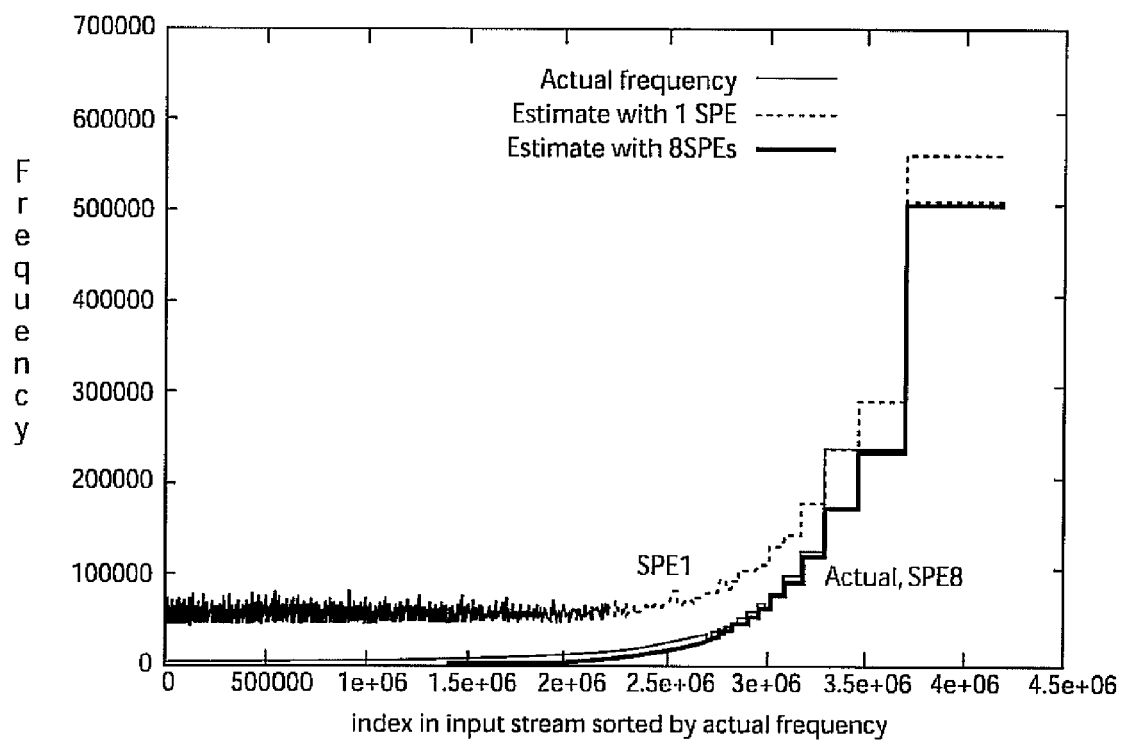
FIG. 20 is a plot comparing quality of estimation of Zipf ($\lambda=1.1$) data using hash-based data partitioning over 1 and 8 SPEs.

FIGS. 19 and 20 compare the frequency estimation for the hash-based data partitioning while using the FCM on 1 SPE and 8 SPEs. In both cases, the frequency estimation improves substantially as the number of SPEs is increased to 8. These results experimentally demonstrate the benefits of using hash-based data partitioning as our sequential kernel.

Figure 21:
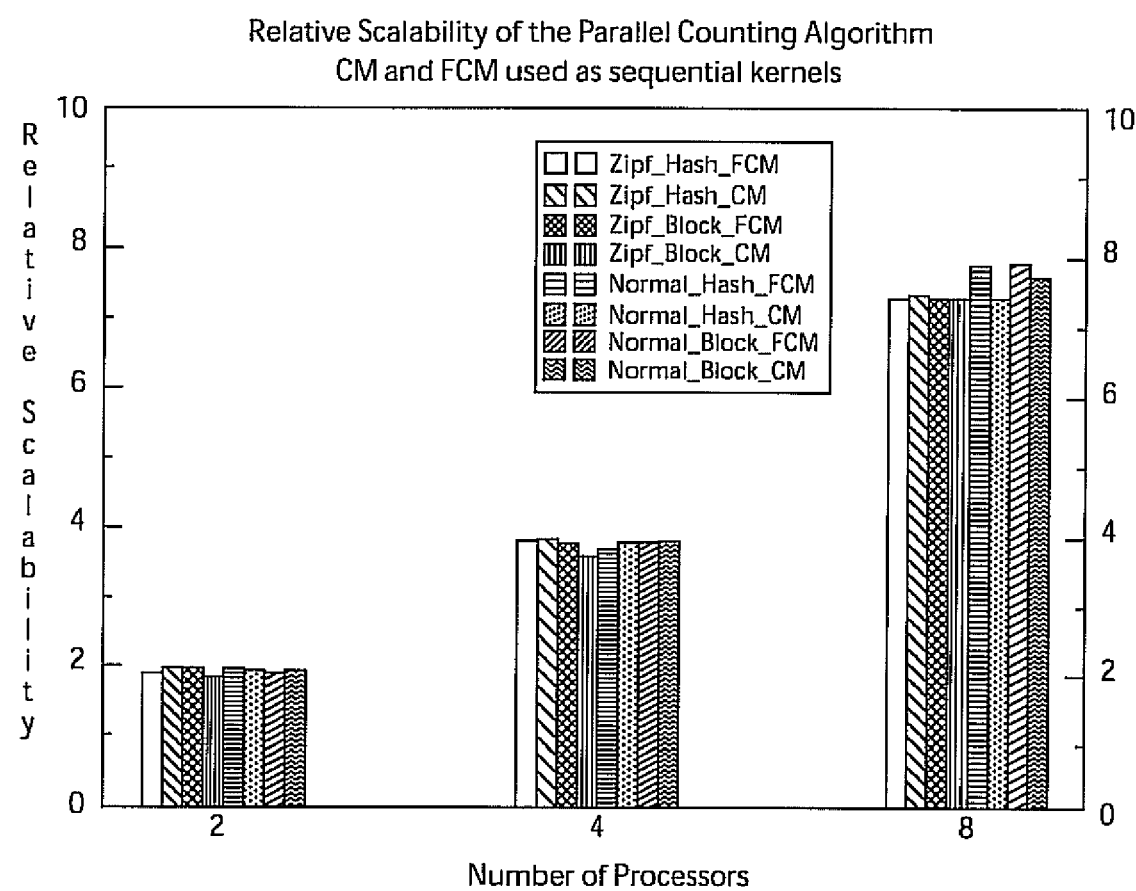
FIG. 21 is a chart showing linear scalability of the parallel counting method as compared to a single SPE execution time for ingesting a data stream.

FIG. 21 illustrates the scalability of the parallel counting method under different runtime configurations. We use the execution time of the method for ingesting a 16 MB data stream on a single SPE as a baseline and compute the relative performance for 2, 4, and 8 SPEs. As shown in FIG. 21, in all cases, the parallel method demonstrates linear scalability as the number of SPEs is increased. The hash-based data partitioning has very similar performance to the block-based data partitioning. In both cases, the cost of processing a point query was insignificant. We also did not find any significant performance overhead due to the additional PPE-side processing or unbalanced data partitioning across the SPEs.

The results presented conclusively demonstrate that on a single processor, FCM's features, namely, the frequency-aware sketch processing using the Misra-Gries Counter, improved the estimation quality for the entire frequency range. These results also illustrate that simply partitioning data across multiple processors does not lead to an improvement in estimation quality as the number of processors is increased. To achieve performance scalability and estimation improvement, it is preferable to use hash-based data partitioning, along with a zero-frequency table.

The problem of counting items from data streams using multi-core processors that have multiple processing engines with low on-chip memories has been addressed. Existing stream counting algorithms have been evaluated and found that they are not suitable for such processors due to their inability to correctly estimate low-frequency and zero-frequency items using low-memory probabilistic data structures. A new stream counting method called Frequency-aware Counting (FCM) improves over the Count-Min algorithm using: (1) A space-conserving frequency counter to dynamically predict relative frequency phases, (2) A sketch data structure that is updated using a frequency-aware approach, and (3) A zero-frequency data structure that reduces the estimation errors due to absent items. The FCM is employed as the kernel in a parallel counting method and implemented over a multi-core processor, the Cell processor. The experiments validate the present principles and the efficacy of the present data structures. The results demonstrate that in a sequential mode, the FCM kernel provides better quality estimates over the CM algorithm both for the high- and low-frequency items. Further, the parallel counting method improves both performance and quality as the number of processors is scaled up. Although the FCM is evaluated using the Cell processor, it can be implemented on similar multi-core processors, other devices/systems and/or using software libraries like Pthreads.

The hash-based data partitioning used herein is an example of a generalized value-based partitioning scheme. A value-based partitioning scheme can exploit statistical characteristics of input data streams. In addition, the Misra-Greis counter may be employed to capture more fine-grained frequency phases for computing top-k elements from data streams.

Having described preferred embodiments of a system and method for analyzing streams and counting stream items on multi-core processors (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A multiprocessor, comprising:
   a plurality of processing cores, which include a coordinating processor core, and at least one other processing core managed by the coordinating processing core;
   the plurality of processing cores being configured to receive and partition a data stream into portions to permit parallel counting for items in the data stream;
   a sequencing kernel executed by each of the core processors to implement a frequency-aware counting method, the frequency aware counting method including:
   a sketch structure configured to store item counts using a plurality of hash functions where a number of hash functions is based on the frequency phase of the item; and
   a zero-frequency table configured to reduce errors due to absent items using all of the hash functions.

2. The multiprocessor as recited in claim 1, wherein the sketch structure and the zero-frequency table include buckets associated with the hash functions that are incremented to provide item counts.

3. The multiprocessor as recited in claim 2, further comprising:
   a first count estimate obtained from the sketch structure by minimizing values over averaged buckets;
   a second count estimate obtained from the zero-frequency table by minimizing values over all buckets; and
   a final count selected as the minimum of the first and second count estimates.

4. A frequency-aware counting method (FCM) for data streams in a processing core, comprising:
   dynamically capturing relative frequency phases of items from a data stream on a non-transitory computer readable storage medium;
   placing the items in a sketch structure, using a plurality of hash functions where a number of hash functions is based on the frequency phase of the item; and
   providing a zero-frequency table to reduce errors due to absent items.

5. The method as recited in claim 4, wherein dynamically capturing relative frequency phases including employing a Misra-Gries counter to track items.

6. The method as recited in claim 5, wherein employing a Misra-Gries counter to track items includes:
   tracking items whose phase frequency satisfies a condition; and
   returning the items that satisfy the condition.

7. The method as recited in claim 4, wherein placing the items in a sketch structure includes determining an offset, gap and number of hash functions for each item and incrementing buckets in the sketch structure based upon the hash functions.

8. The method as recited in claim 4, wherein providing a zero-frequency table to reduce errors due to absent items including using all hash functions to increment buckets in the zero-frequency table.

9. The method as recited in claim 4, further comprising:
   in response to a query, determining an offset and a gap in the sketch structure from each item; and
   computing a count estimate from the sketch structure by minimizing values over buckets with averaged numbers of hash functions.

10. The method as recited in claim 9, further comprising:
    computing a count estimate from the zero-frequency table by minimizing values over all buckets; and
    computing a final count as the minimum of count estimates from the sketch structure and the zero-frequency table.

11. A non-transitory computer readable storage medium comprising a computer readable program for a frequency-aware counting method (FCM) for data streams wherein the computer readable program when executed on a computer causes the computer to perform the steps as recited in claim 4.

12. A method for parallel stream item counting, comprising:
    partitioning a data stream into portions;
    assigning the portions to a plurality of processing cores; and
    executing a sequential kernel on a non-transitory computer readable storage medium including a computer readable program, wherein the computer readable program when executed on each of the processing cores causes the processing cores to compute a local count for items in an assigned portion of the data stream for that processing core, and further wherein executing the sequential kernel includes a frequency-aware counting method (FCM).

13. The method as recited in claim 12, wherein partitioning a data stream into portions includes partitioning the data stream into portions by a hash-based partitioning.

14. The method as recited in claim 13, wherein the hash-based partitioning includes providing values for items in the data streams and placing the items in buckets based on the values.

15. The method as recited in claim 12, wherein partitioning a data stream into portions includes partitioning the data stream into portions by a block-based partitioning.

16. The method as recited in claim 15, wherein the block-based partitioning includes dividing the data stream into equal-sized blocks of data.

17. The method as recited in claim 12, further comprising:
    querying participating processing cores for a count;
    responsive to the query, determining for each participating processing core, a local item count; and
    summing up the local item counts to provide a final result for the query.

18. The method as recited in claim 12, wherein executing the FCM sequential kernel includes:
    providing a sketch structure to dynamically capture relative frequency phases of items from the data stream;
    utilizing a plurality of hash functions based on the frequency phase; and
    providing a zero-frequency table to reduce errors due to absent items.

19. A non-transitory computer readable storage medium comprising a computer readable program for parallel stream item counting wherein the computer readable program when executed on a computer causes the computer to perform the steps as recited in claim 12.

* * * * *